United States Patent

Okabe et al.

[11] Patent Number: 5,800,736
[45] Date of Patent: Sep. 1, 1998

[54] SMECTIC LIQUID CRYSTAL COMPOSITION AND LIQUID CRYSTAL DEVICE

[75] Inventors: Eiji Okabe; Mayumi Tanabe; Shinichi Saito, all of Ichihara; Akira Sakaigawa, Osaka; Hitoshi Takeda, Osaka; Masami Kido, Osaka; Takashi Kaneko, Osaka; Mitshuhiro Koden, Osaka; Teiyu Sako, Osaka, all of Japan

[73] Assignees: Chisso Corporation; Sharp Kabushiki Kaisha, both of Osaka, Japan

[21] Appl. No.: 860,525

[22] PCT Filed: Dec. 27, 1995

[86] PCT No.: PCT/JP95/02725

§ 371 Date: Jan. 5, 1998

§ 102(e) Date: Jan. 5, 1998

[87] PCT Pub. No.: WO96/20985

PCT Pub. Date: Jul. 11, 1996

[30] Foreign Application Priority Data

Dec. 29, 1994 [JP] Japan .................. 6-339112
Dec. 29, 1994 [JP] Japan .................. 6-339113

[51] Int. Cl.⁶ .......... C09K 19/34; C09K 19/30; G02F 1/133; G02F 1/1337
[52] U.S. Cl. ................. 252/299.61; 252/299.63; 252/299.01; 349/143; 349/172; 349/184; 349/133
[58] Field of Search ............ 252/299.01, 299.61, 252/299.63; 349/143, 172, 184, 133

[56] References Cited

U.S. PATENT DOCUMENTS

| | | | |
|---|---|---|---|
| 5,200,109 | 4/1993 | Iwaki et al. | 252/299.61 |
| 5,478,496 | 12/1995 | Gray et al. | 252/299.61 |
| 5,529,717 | 6/1996 | Murashio et al. | 252/299.61 |

FOREIGN PATENT DOCUMENTS 3703651  9/1987  Germany .

OTHER PUBLICATIONS

W. Schäfer et al., Journal f. prakt. Chemie, vol. 331, No. 4, 1989, pp. 631–636.

*Primary Examiner*—Shean C. Wu
*Attorney, Agent, or Firm*—Wenderoth, Lind & Ponack L.L.P.

[57] ABSTRACT

A liquid crystal composition is realized, which composition simultaneously exhibits a negatively large $\Delta\epsilon$ value suitable to $\tau$-Vmin, and SA phase within a sufficient temperature range for realizing a good alignment.

A smectic liquid crystal composition containing component (AI), component (B) and/or component (C), expressed by the following formulas:

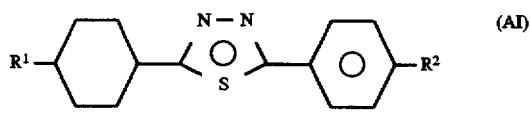

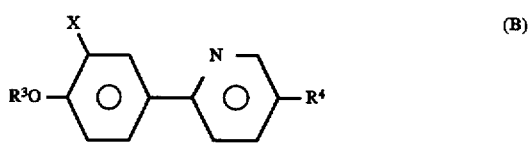

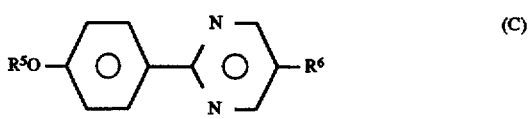

wherein $R^1$ represents an alkyl group of 1 to 9 carbon atoms, $R^2$ represents an alkyl group of 1 to 9 carbon atoms, $R^3$ represents an alkyl group of 1 to 18 carbon atoms, $R^4$ represents an alkyl group of 1 to 18 carbon atoms, X represents H or F, $R^5$ represents an alkyl group of 6 to 15 carbon atoms and $R^6$ represents an alkyl group of 6 to 15 carbon atoms.

Ferroelectric liquid crystal material having a negative dielectric anisotropy is applicable to display element utilizing AC-stabilizing effect and $\tau$-Vmin. Further, as to the composition containing

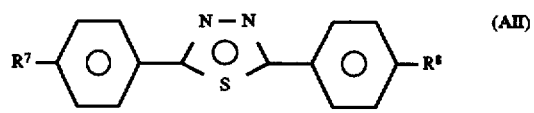

as an additional component, SA phase appears within a broad range; hence the composition can be made up into a ferroelectric liquid crystal composition having a good alignment.

15 Claims, 9 Drawing Sheets

Driving scheme (B)

A. Example of the present invention

B. Reference example

SMECTIC LIQUID CRYSTAL COMPOSITION AND LIQUID CRYSTAL DEVICE

This application is a 371 of PCT/JP95/02725, filed Dec. 27, 1995.

1. Technical Field

This invention relates to a liquid crystal composition usable for a liquid crystal display element, particularly preferably usable for a ferroelectric liquid crystal display element, and a ferroelectric liquid crystal display element using the same.

2. Background Art

At present, liquid crystal display elements have been broadly used. As a low grade display element, TN (twisted nematic) type display mode has been most broadly used. This TN display is provided with many advantages such as low driving voltage, low electric power consumption, etc. However, as to response speed, this TN mode is far inferior to emissive mode display elements such as those of cathodic ray tube, electroluminescence, plasma display, etc. A new type TN display element having the twisted angle increased up to 180° to 270°, the so-called STN display element has been developed and its display capacity has been increased with a leap, but the response speed has been still yet limited. Further, recently, display elements provided with switching devices in the each pixels have been put to the market. Most of the elements have been referred to as Thin Film Transistor abbreviated to TFT mode, and in the future, it has been expected to be a liquid crystal element having a high resolution, a large pixels and a full color. However, as to this mode, too, drawbacks of the display size and production cost have been mentioned. TFT has employed semiconductor technique; hence the display size has been limited to ten and several inches size. Alike, resolution, too, has been regarded to be limited to about 1,000 lines.

The ferroelectric liquid crystal display as the main subject of the present invention, potentially has a possibility of realizing both of a large display of 10 and several inches size or more and reduction of production cost, which cannot be realized by the above TFT element (see Clark et al., Applied Phys. lett., 36, 899 (1980)). This display mode utilizes chiral smectic phases such as chiral smectic C phase exhibiting ferroelectricity (hereinafter abbreviated to Sc* phase), etc. The above method has been referred to as surface stabilized ferroelectric liquid crystal display.

It has been undertaken by appliance-maker and material-maker to make up it into a commercial product, and improvement of the characteristics and commercialization have been carried out by the makers.

The reason consists in that ferroelectric liquid crystal elements have the following characteristics in principle:

1. High speed response property
2. Memory property
3. Wide viewing angle

These characteristics suggest a possibility of a high resolution display of SSFLC, and this makes SSFLC very attractive.

However, as the research has been advanced, problems to be solved have been clarified. Among these problems, appearance of stable memory state is the first problem. Difficulty in the appearance of stable memory state has been considered to be due to non-uniformity of smectic layer structure (for example, twisted alignment, chevron structure) and occurrence of the inside reverse electric field, etc. originated from largeness of spontaneous polarization.

As a means for exhibiting the stable memory state, there has been proposed a method of using a ferroelectric liquid crystal composition having a negative dielectric anisotropy ($\Delta\epsilon<0$, where $\Delta\epsilon$ represents a dielectric anisotropy) (Le Piesant, et al., Paris Liquid Crystal Conference, p. 217 (1984)). This method has been referred to as AC-stabilizing effect.

Liquid crystal molecules exhibiting a negative $\Delta\epsilon$ value in homogeneously aligned cell, have a property of being directed to a parallel state to the glass substrate when an electric field is applied (that is, long axis of molecules is directed vertically to the direction of the electric field). When a low frequency electric field is applied, the spontaneous polarization can follow to the electric field; hence when the direction of the electric field is switched, the liquid crystal molecules, too accordingly move to another stable state, wherein a parallel state to the substrate is formed due to $\Delta\epsilon$ effect. When a high frequency electric field is applied, the spontaneous polarization cannot follow the reversion of the electric field; hence only the $\Delta\epsilon$ is effected, and even when the direction of the electric field is reversed, the liquid crystal molecules do not move and the direction of the molecules is parallel to the substrate, as it is. This is the exhibition mechanism of the memory property, making use of the AC-stabilized effect. A high contrast is obtained thereby. This example has been reported by Juary et al (SID '85, Digest p. 128 (1985)).

It has been known that the ferroelectric liquid crystal material having a negative dielectric anisotropy, further has another specific property, that is, the memory-reversible pulse width ($\tau$) has a minimum value (Vmin) relative to the applied voltage. Making use of this property, a display element having a high contrast without any cross-talk has been realized (Ferroelectrics, vol. 122, p. 63, (1991)).

As described above, the ferroelectric liquid crystal material having a negative dielectric anisotropy is applicable to a display element utilizing the AC-stabilized effect and $\tau$-Vmin.

In order to practically use the ferroelectric liquid crystal material utilizing the negative $\Delta\epsilon$, many characteristics are required, but it is the present status that any single compound cannot satisfy the requirements; hence materials have been provided in the form of mixture.

In general, compositions can be composed even only of liquid crystal compounds or non-crystalline compounds. As to the ferroelectric liquid crystal composition, there are a method of composing it only of ferroelectric liquid crystal compounds, and a method of blending compounds or compositions exhibiting tilted smectic phase (hereinafter abbreviated to phase of Sc, etc.) such as achiral, smectic C, F, G, H, I, etc., as basic substances, with at least one kind of ferroelectric liquid crystal compounds or non-liquid crystalline, optically active compounds, to thereby make up the whole into a composition exhibiting a ferroelectric liquid crystalline phase.

Now, a number of liquid crystal compounds containing thiadiazole ring which forms a basic structure of component (A) of the present invention, have already been known.

For example, the above compounds have been disclosed in J. Prakt. Chemie, vol. 332, p. 933 (1980), DD 247221 Al and DD 247694 Al.

In J. Prakt.Chemie discloses the following compound:

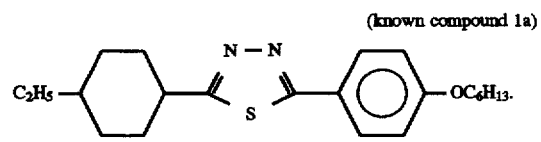

(known compound 1a)

Further, Examples of DD 247694 Al and DD 247221 Al disclose the following compound:

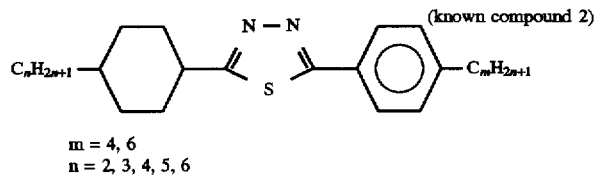

m = 4, 6
n = 2, 3, 4, 5, 6 and the following composition:
Mother liquid crystals GM

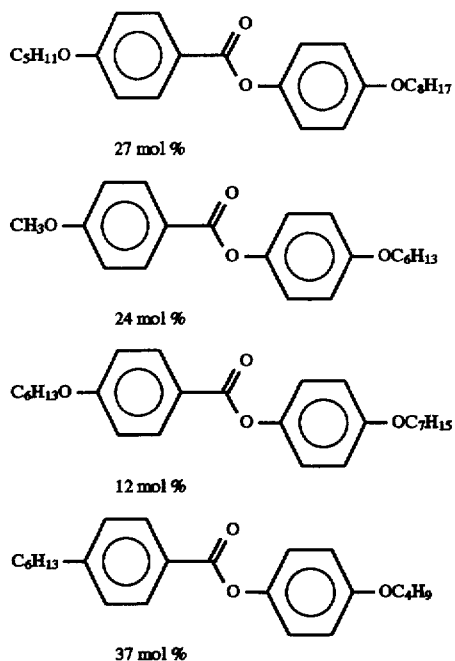

and

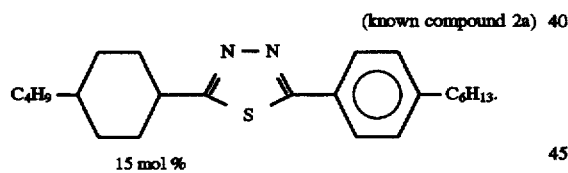

Any of the compositions of these examples exhibit only nematic phase. Further, any of the compounds containing thiadiazole ring disclosed above do not exhibit Sc phase; hence the compounds are considered to be unsuitable as a basic substance of ferroelectric liquid crystals.

Further, Japanese patent application laid-open Hyo No. Hei 2-500191 claims for patent a composition containing a broad range of thiadiazole compounds containing the group (A) of the present invention. Further, the application discloses compounds similar to the following compounds (AI) of the present invention, and describes that the compounds both exhibit Sc phase.

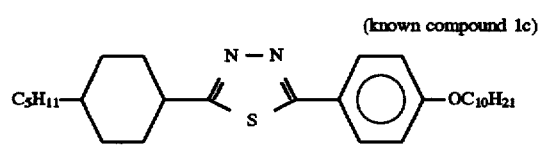

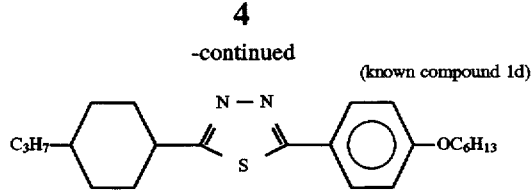

However, compositions containing these components have been practically not disclosed.

In view of the above informations, it can be presumed that as to compounds having a thiadiazole ring containing cyclohexane ring, Sc phase might appear in only a part of compounds of alkoxyphenyl type as in known compounds 1c and 1d.

Further, the above patent application laid-open Hyo No. Hei 2-5100191 also claims for a combination with the component (B) of the present invention, and discloses the below mentioned, broad range of compounds, as compounds miscible with thiadiazole core compounds. The compounds of the present invention correspond to those shown therein as (IId) and (IIg). However, any example using a compound of the formula (IIg) as component has been practically not shown. In addition, any examples using a combination of (AI) with (IId) of the present invention have not been utterly found.

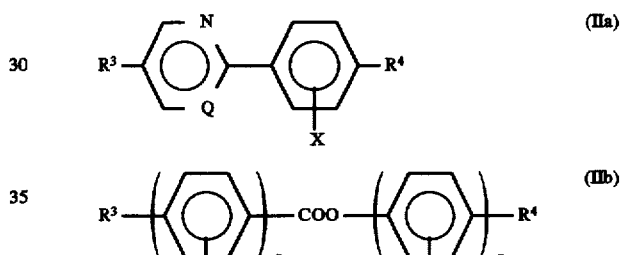

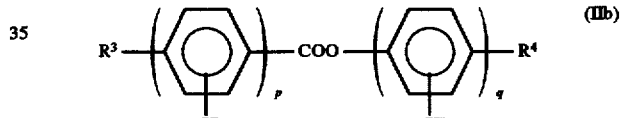

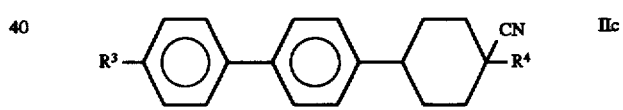

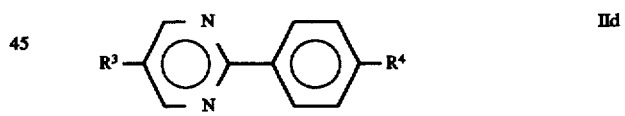

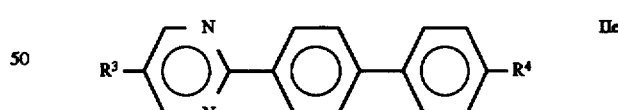

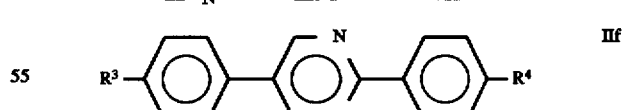

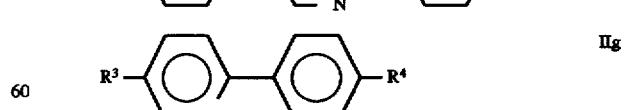

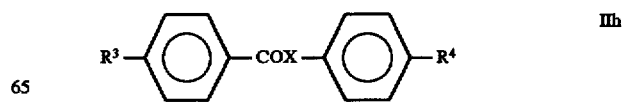

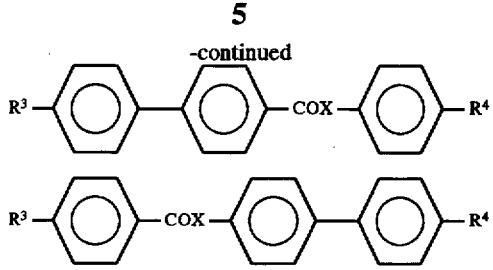

In addition, the above application claims a composition containing the compound having the thiadiazole ring, in a quantity of preferably 0.5 to 30% by weight, but even as the practical composition, those exceeding a concentration of 42% have not been disclosed. As described above, Japanese patent application laid-open Hyo No. Hei 2-500192 discloses only a lower part of the used concentration of the thiadiazole compounds.

Further, the present inventors have already filed a liquid crystal composition using the following compound having a thiadiazole ring (Japanese patent application laid-open No. Hei 7-70564):

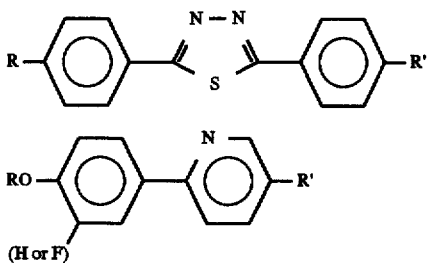

As described above, the display element using a ferroelectric liquid crystal composition having a negative $\Delta\epsilon$ is provided with a superior characteristic not found in conventional ferroelectric liquid crystal display elements, but current compositions for $\tau$-Vmin have a number of problems. The problems are roughly summarized into the following two: exhibitions of a sufficiently large negative $\Delta\epsilon$ and a good alignment.

As to the sufficiently large $\Delta\epsilon$ as the first problem, the following explanation may be made: if the layer structure of smectic C phase (hereinafter abbreviated to SC phase) is supposed to be an ideal book shelf structure, the following equation comes into existence:

$$Vmin = Emin \times d = \frac{P_s \times d}{\sqrt{3 \times \epsilon 0 \times (\Delta\epsilon \times \sin^2\theta - \delta\epsilon)}}$$

Wherein Emin represents a voltage in the pulse width of the minimum value of electric field intensity; d represents cell thickness; Ps represents spontaneous polarization; $\epsilon 0$ represents vacuum dielectric constant; $\delta\epsilon$ represents dielectric biaxitiality; $\Delta\epsilon$ represents dielectric anisotropy; and $\theta$ represents tilt angle (Liquid Crystal 6, No. 3, p. 341 (1989)).

The numeral values in the present, practical environments were applied to the above equation, to assumably calculate the value of $\Delta\epsilon$.

Since the present, conventional IC applicable voltage is about 40 V, the maximum Emin is 40 V. When the spontaneous polarization is 7 nC/cm$^2$ or more, the occurrence of the reverse electric field is notable; hence the usable, largest spontaneous polarization is 7 nC/cm$^2$. When conditions of a tilt angle of 20° and a cell gap of 2 μm are applied to the above equation, a necessary condition of a $\Delta\epsilon$ of $-2$ or less is led. Unless the $\Delta\epsilon$ is $-2$ or less, the resulting composition cannot be used for $\tau$-Vmin mode; hence it is the first problem to satisfy this condition.

As to the good alignment as the second problem, explanation will be made as follows. A material exhibiting a good alignment is required to have a phase transition sequence of starting from high temperature side, isotropic liquid phase (hereinafter abbreviated to Iso phase), cholesteric phase (hereinafter abbreviated to Ch phase), SA phase and SC* phase. In the absence of SA phase, SC* phase wherein the nominal direction of the layer surface in the smectic phase does not accord with the parallel direction of liquid crystal molecules, appears at the time of gradual cooling. In short, according to such a conventional gradual cooling starting from the higher temperature side, it is difficult to form a large liquid crystal uniform alignment domain (the so-called monodomain). Thus, in order to obtain the monodomain there has been proposed a method of applying an external force by an electric field, a magnetic field, or the like during a process of being transferred into SC phase by cooling to be thereby forcibly aligned. However, such a monodomain can not be always formed according to the alignment-controlling treatment by way of such an external force.

On the other hand, in the case of a material having SA phase, even when no external force is applied, it is possible to obtain a good monodomain state by gradual cooling. Because, in the SA phase, the direction on normal line of the layer surface is the same with that on the long axe of liquid crystal molecules. The state of the layer once formed in the SA phase is retained even after transferred into SC* phase; hence the uniform monodomain is obtained even in SC* phase. Accordingly, the material having SA phase on the higher temperature side of SC* phase is superior in the alignment of SC* phase.

Further, in order to obtain a superior alignment of SC* phase, it is necessary to pass through Ch phase having a mesophase order between Iso phase and SA phase. In order to obtain a superior alignment, it is necessary that the helical pitch length of Ch phase is sufficiently long in the vicinity of the transition into SA phase (Japanese patent application laid-open No. Sho 61-255323).

The inventive subjects of the present invention are to realize a liquid crystal composition simultaneously exhibiting a sufficiently large negative $\Delta\epsilon$ suitable to $\tau$-Vmin and SA phase within a sufficient temperature region for realizing a superior alignment.

It is not so difficult to satisfy the first and second problems independently from each other. However, it is difficult to satisfy the both simultaneously. In addition to the satisfaction of the both, there are required various conditions of the resulting composition such as a low viscosity, a broad, driving temperature range, a low temperature storage property, etc.

DISCLOSURE OF INVENTION

In order to solve the problems of the present invention, it is necessary to introduce new components into the composition.

The constitutions of the present invention are as follows:

(1) A smectic liquid crystal composition containing component (AI) and component (B) and/or component (C), each expressed by the following formulas:

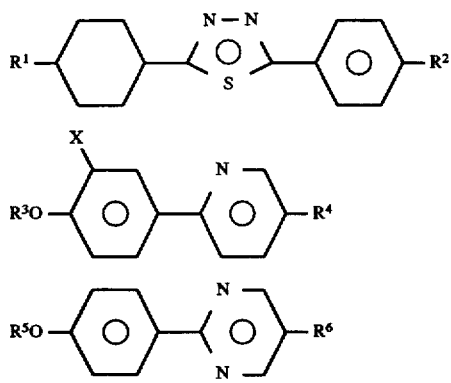

wherein $R^1$ represents an alkyl group of 1 to 9 carbon atoms, $R^2$ represents an alkyl group of 1 to 9 carbon atoms; $R^3$ represents an alkyl group of 1 to 18 carbon atoms, $R^4$ represents an alkyl group of 1 to 18 carbon atoms, X represents H or F, $R^5$ represents an alkyl group of 6 to 15 carbon atoms and $R^6$ represents an alkyl group of 6 to 15 carbon atoms.

(2) A smectic liquid crystal composition according to item (1), consisting of component (AI) and component (B).

(3) A smectic liquid crystal composition according to item (1), consisting of component (AI) and component (C).

(4) A smectic liquid crystal composition according to item (1), consisting of component (AI), component (B) and component (C).

(5) A smectic liquid crystal composition according to either one of items (1), (2) and (3), containing a component (AII) expressed by the following formula, as an additional component:

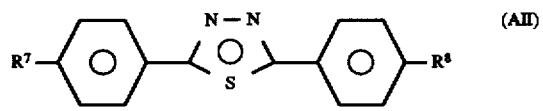

wherein $R^7$ represents an alkyl group of 2 to 9 carbon atoms and $R^8$ represents an alkyl group of 2 to 9 carbon atoms.

(6) A smectic liquid crystal composition according to either one of items (1) to (5), wherein the content ratio (% by weight) of components consisting of components (AI) and (AII) (group A) to components consisting of (B) and (C) (group BC) is 1:3 to 3:1.

(7) A smectic liquid crystal composition according to either one of items (1) to (5), wherein the content ratio by weight of components of group A is 50% by weight or more.

(8) A smectic liquid crystal composition containing the composition according to either one of items (1) to (5), in a quantity of 70% by weight or more based upon the total quantity. (9) A ferroelectric, chiral smectic C liquid crystal composition obtained by adding one or more kinds of optically active compounds to either one of a smectic C liquid crystal composition according to either one of items (1) to (8).

(10) A liquid crystal element using a liquid crystal composition according to item (9). (11) A liquid crystal element according to item (10), wherein the flex direction of the smectic layer structure of the ferroelectric liquid crystal is the same as the direction of the monoaxially aligning treatment of the aligning film.

(12) A liquid crystal element according to item (10) or (11), characterized in that the pretilt angle of liquid crystal molecules on the intersurface of liquid crystals/aligning film is 10°0 or less.

(13) A process for driving a liquid crystal element according to item (10), (11) or (12), characterized in that, in a liquid crystal element provided with a pair of insulating substrates each having an electrode; a chiral smectic liquid crystal composition intervened between the substrates, a driving means for changing over the optical axis of liquid crystals by selectively applying a voltage upon the electrodes; and a means for optically identifying the change-over of the optical axis, a chiral smectic liquid crystal composition according to item (9) is used as the liquid crystal composition; as the electrodes, a plurality of scanning electrodes and a plurality of signal electrodes are arranged in alternately crossed directions; the chiral smectic liquid crystal composition in the domain where the scanning electrodes are crossed with the signal electrodes constitutes a ferroelectric liquid crystal element having two stabilized states; and when the domain is rendered as picture elements and the picture elements are selected, and the pulse voltage to be impressed upon the pixels have a relationship of 0<V2<V4 and V2−V1<V4−V3, wherein V1 and V2 refer to a first pulse voltage and a second pulse voltage, respectively in one stable state of the ferroelectric liquid crystal molecules, and V3 and V4 refer to the same in another stable state of the ferroelectric liquid crystal molecules constituting a portion of the pixels, even when the second pulse voltage V2 is applied successively to the first pulse voltage V1 or the second pulse voltage −V2 is applied successively to the first pulse voltage −V1, to thereby make the ferroelectric liquid crystal molecules constituting the portion within the pixels, one stable state, or another stable state, and even when the second pulse V4 is applied upon the same pixels, successively to the first pulse V3, or the second pulse voltage −V4 is applied successively to the first pulse voltage −V3, the above stable states of the ferroelectric liquid crystal molecules constituting the same portion inside the pixels are retained.

(14) A process for driving a liquid crystal element according to item (13), characterized in that the chiral smectic liquid crystal composition constitutes a ferroelectric liquid crystal element having two stable states, and in the pulse width-pulse voltage characteristic of the single polarity pulse necessary for rewriting from one stable state to the other stable state, the pulse voltage affording the minimum value of the pulse width is 60 V or lower.

(15) A process for driving a liquid crystal element according to item (13), characterized in that the chiral smectic liquid crystal composition constitutes a ferroelectric liquid crystal element having two stable states, and in the pulse width-pulse voltage characteristic of the single-polarity pulse necessary for rewriting from one stable state to the other stable state, the pulse voltage affording the minimum value of the pulse width is 40 V or lower.

The main subject of the present invention is a composition consisting of a compound expressed by (AI) and compounds expressed by (B) and (C). The component (AI) is an indispensable component and a basic component of the present invention. On the other hand, (AII) having a thiadiazole structure as in (AI) is an additional component and it may be not at all contained or may be contained. When it is contained, a concentration lower than (AI):(AII)=1:1 is preferred. As already mentioned, compounds of (AI) so far known (known compound 1 and compounds of group 2) exhibit no Sc phase; hence they have not been used as the basic substance for ferroelectric liquid crystals. Whereas, the present inventors this time have found the superiority of the compound (AI) and have filed the present patent application.

Further, it is possible to optionally establish the content ratio of components (group A): (group BC (B+C)), but a composition having a ratio of 1:3 to 3:1 is preferred and a composition having a ratio of 1:1 to 3:1 is more preferred. Because as to compositions corresponding to these ranges, both the liquid crystal temperature domain and the value of Δε fall in preferable ranges.

The afore-mentioned, prior application, Japanese patent application laid-open Hyo No. Hei 2-500191, refers to a lower portion of concentration of a thiadiazole compound as a constitution of the invention, which claims a composition containing a compound containing a thiadiazole group, particularly preferably in a quantity of 0.5 to 30% by weight. Even as a practical composition, that exceeding a concentration of 42% by weight has not been disclosed.

Whereas, the present invention employs as a main subject of the invention, a composition having a high content of a compound containing a thiadiazole ring. Because, unless its content falls within such a range, a composition aimed in the present invention cannot be composed. The composition of the present invention is preferred to contain the component of group A in a concentration of 40% by weight or higher, preferably 50% by weight or higher.

As to the composition described in claim (5), it is possible to add compounds other than components of the composition of the present invention, to the composition of the present invention in a concentration of 30% by weight or lower. Such compounds are preferably liquid crystal compounds, more preferably smectic liquid crystal compounds. Further, when the viscosity of the whole of the composition is increased, the response of the composition is retarded; hence the viscosity of added compounds is preferred to be lower. Further, such compounds are added in order to adjust the values of various physical properties other than viscosity such as Δε, Δn, etc. These representative compounds will be exemplified.

Further, an optically active compound is added to the composition of the present invention, to prepare a ferroelectric liquid crystal composition. The proportion of the optically active compound added depends upon the value of the spontaneous polarization of the composition itself. Because, as already described, if the spontaneous polarization of the composition is in excess, a reverse electromotive force occurs inside.

If an optically active compound is added to the smectic liquid crystal composition, and the characteristics are not notably damaged, it does not matter whether such an optically active compound is those of any kind. Among such compounds, those inducing a high speed response are preferred.

Optically active compounds generally exhibit a high viscosity, as compared with those of basic substances forming liquid crystals. Addition of an excess quantity of optically active compounds notably increases the viscosity of the composition and hence increases the response time. From this viewpoint, it is necessary to add the optically active compound in a quantity of 30% or less, preferably 10% or less and particularly preferably 5% or less.

The quantity of optically active compounds added determines the spontaneous polarization value of the composition. The added, optically active compounds each have a reducing spontaneous polarization value intrinsic thereof. As already described, the spontaneous polarization of composition for τ-Vmin has an upper limit in its use. Since the compositions is established to have a value not exceeding the upper limit value of the spontaneous polarization, the upper limit of the added quantity is necessarily determined. In order to obtain a desired spontaneous polarization value, it is necessary to avoid the viscosity increase; hence the optically active compounds are preferred to induce a low viscosity.

Figure 1:
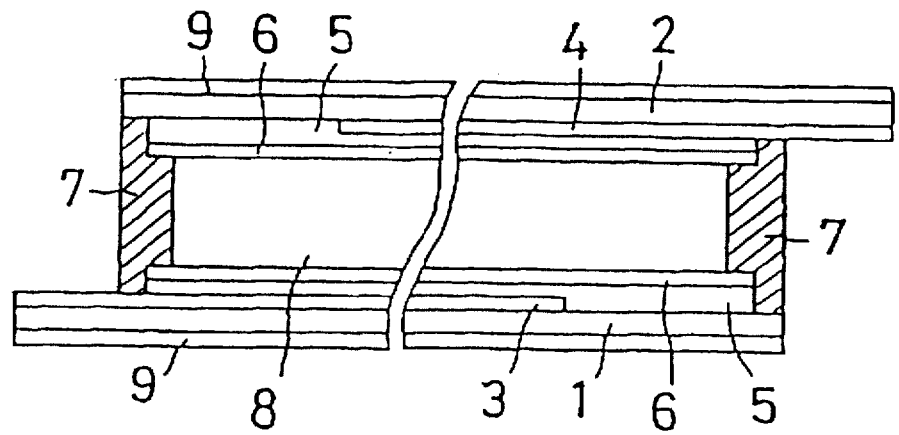
FIG. 1 refers to a cross-sectional view for illustrating the structure of a ferroelectric liquid crystal element using the smectic liquid crystal composition of the present invention and the preparation method of the same.

The present invention will be described in more detail.

As described above, a plurality of liquid crystal compounds containing a thiadiazole ring, as component (A) of the present invention have already been known. The present inventors have, as described above already filed a patent application directed to such a composition. However, we have found a drawback of the composition. It will be described below.

The application is directed to a smectic liquid crystal composition comprising the following components (AII) and (B)

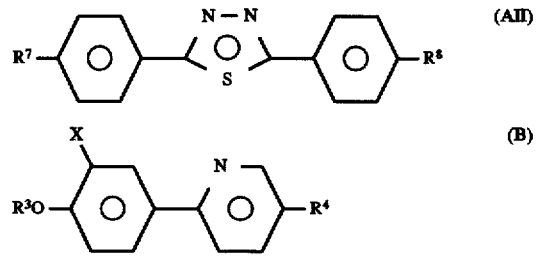

It has been clarified that the composition of the application can be preferably used for a ferroelectric liquid crystal display element of τ-Vmin mode.

However, this composition has an evident drawback that the temperature range of SA phase is extremely narrow. The reason is dependent upon the following characteristics of the components:

(AII) component exhibits no SA phase;
(B) component wherein X=H exhibits no SA phase
(B) component wherein X=F exhibits SA phase to a certain extent.

As already described above, in order that a ferroelectric liquid crystal composition exhibits a good alignment, it is a necessary condition that SA phase is present to a certain extent or more. The composition of the application generally has only a narrow temperature range of SA phase; hence the composition has a drawback in its alignment.

Firstly, it has been studied whether or not only a compound containing a thiadiazole having an alkyl group at its end, but also a compound having an alkoxy group are usable.

The following compound (C) is a component compound of the above application, and compound (D) is a corresponding compound having an alkoxy group at its end:

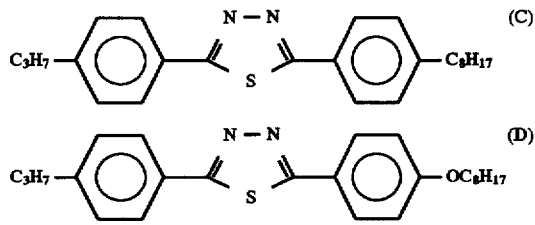

The dielectric anisotropies obtained by extrapolation of compound (C) and compound (D) were respectively −4.3 and −2.7 (Comparative example 1). Thus, it has been clarified that the terminal alkoxy group is not suitable to the mode of the present invention, rather than the terminal alkyl group.

Next, the present inventors have studied use of a cyclohexane compound as a component (Comparative example 2). Compound (E) is the (A) component of the present invention and Compound (F) is the corresponding alkoxy compound.

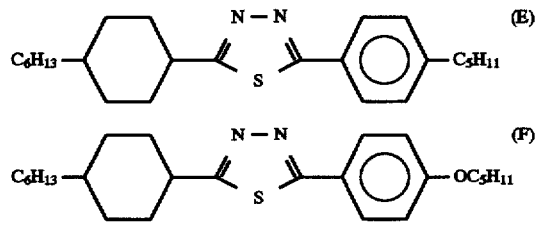

Japanese patent application Hyo No. Hei 2-500191 discloses the liquid crystal phase transition points of (known compound 1c) and (known compound 1d) as preferably usable thiadiazole compounds.

The above patent application Hyo No. Hei 2-500191 discloses the following (11a), as a component compound usable in combination with thiadiazole compound:

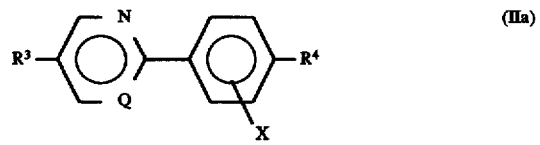

In the above patent application Hyo No. Hei 2-500191, a compound (11d) is mainly added. Thus, the present inventors, too, used the following compound (G) which belongs to (11d) and has been also used in the above Japanese patent application Hyo No. Hei 2-500191, as an additional compound, to compare compound (E) with compound (F):

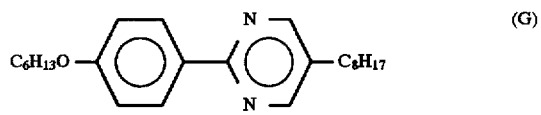

The dielectric anisotropy values obtained by extrapolation of compound (E) and compound (F) were respectively −5.34 and −4.0. The above patent application disclosed that compound (F) was preferred, but in fact, it has been found that (E) was more preferred.

As to the value of $\Delta\epsilon$, that of (AI) of the compound of the present invention is larger than those of these known compounds; hence (AI) can be preferably used.

Further, the present inventors tried to use a cyclohexylthiadiazole as a component of the composition. As a result, it was found that its alkyl compound was usable, but its alkoxy compound was difficult to use.

In the present invention taking the above results into consideration, the component compound was limited to compound (AI). Japanese patent application Hyo No. Hei 2-500191 discloses only the transition points of compounds of alkoxy group (known compounds IC and ID), but practically preferable compound is a compound of an alkyl group, in spite of not exhibiting SC phase. Such a difference cannot be easily anticipated from Japanese patent application Hyo No. Hei 2-500191.

Further, in Examples, the second problem to be solved by the present invention, that is, the presence of SA phase will be noted. The composition consisting of compound (E) and compound (G) is broader in the concentration region exhibiting SA phase than that of the composition consisting of compound (F) and compound (G). In more detail, the composition consisting of compound (F) and compound (G) exhibits SA phase in the case where the proportion of compound (F) is 10% by weight or less. When the proportion exceeds the above value, no SA phase is exhibited. Whereas, the composition consisting of compound (E) and compound (G) exhibits SA phase broadly over all of prepared component proportions.

The compound of the formula (11a) of Japanese patent application Hyo No. Hei 2-500191, represented by compound (G) exhibits a phase sequence of SC-SA-N-Iso; hence the compound has been practically used as a basic substance of many ferroelectric liquid crystal compositions. However, even when the compound (F) is blended with the above preferable basic substance, the compound (F) cannot be used only in the proportion of 10% by weight or less, in view of the condition of the SA phase exhibition which is the problem of the present invention.

The compound (B) of the present invention wherein X=F does not exhibit SA phase; hence when it is used as a basic substance in place of compound (G), its mixture with compound (F) is further difficult to exhibit SA phase.

Accordingly, even in the case of the second problem to be solved by the present invention, it is seen that the compound (E), that is, the compound (A) of the present invention is superior to the compound (F), that is, the alkoxy compound corresponding to the compound (A) of the present invention.

Further, when it is taken into consideration to simultaneously satisfy the first and second problems to be solved by the present invention, it is found that the compound (AI) of the present invention is superior.

As already described, when the composition consisting of compound (F) and compound (G) exhibits SA phase, the proportion of compound (F) is 10% by weight or less. However, AC value at the time of the 10% by weight is +0.04. This value is not a value in which the τ-Vmin curve appears. The composition consisting of the compound (F) and the compound (G) does not accord with the object of the present invention at all.

As described above, the difference between the compound (E) and the compound (F) seems at a glance to be nothing but a difference between the alkyl group and the alkoxy group, but the characteristics of the both are very different in their actual uses.

For the above reasons, it can be seen that the component (AI) of the present invention is superior.

In addition, the component (B) of the present invention includes compounds already filed by the present inventors. Namely, the compound wherein X=H is a compound filed in Japanese patent application laid-open No. Sho 62-223172. The compound wherein X=F is a compound filed in Japanese patent application laid-open No. Sho 62-223171. Further, both the compounds are respectively component compounds of a composition filed in Japanese patent application laid-open No. Hei 2-135278. The composition of the present invention, too, can be included in the claims. However, in these patent applications, a combination with the formula (AI) is not disclosed. Thus, the applications are entirely different from the present application; hence the application cannot be anticipated.

The compound of the formula (B) exhibits smectic C phase in the low temperature range including room temperature and its melting point is low. However, since the compound (B) exhibits no SA phase, it seems at a glance to be unsuitable to solution of the problem of the present invention, but it is superior in the capability of forming SA phase and SC phase.

On the other hand, the pyrimidine compound (the general formula (C)) represented by (G), generally has a I-N-SA-SC phase sequence starting from high temperature. Thus, the compound seems at a glance to be suitable to the solution of the problem of the present invention, as compared with the compound of the formula (B). However, as seen in Examples, its combination with (AI) of the present invention can satisfy the SA phase region, but it is insufficient in the capability of retaining Δε value at negative value, and nevertheless, it has a sufficient capability as a candidate, of simultaneously solving both the problems of the present invention.

Further, the combination of the compounds (B) and (C) of the present invention can solve both the problems of the present invention simultaneously.

In particular, compositions of the combinations of (AI)+ (B) and (AI)+(B)+(C) are very preferably usable.

Compound (AII) exhibits SC phase in a broad range; hence it can be used as a component of the composition of the present invention.

However, if (AII) is contained in excess, undesirable high melting of composition, undesirable viscosity increase, etc. are brought about in the composition. Further, as described below in Examples, deterioration due to ultraviolet rays proceeds rapidly; hence it is necessary to avoid use in a high concentration.

BEST MODES FOR CARRYING OUT THE INVENTION

Table 1 mentions compounds (AI) preferably usable in the present invention and their phase transition points.

Table 2 mentions compounds (AII) preferably usable in the present invention and their phase transition points.

Table 3 mentions compounds of (B, X=X) preferably usable in the present invention and their phase transition points.

Table 4 mentions compounds preferably usable in the present invention and their phase transition points.

Table 5 mentions compounds (C) preferably usable in the present invention and their phase transition points.

TABLE 1

Compounds of (AI) preferably usable in the present invention and their phase transition points

| In formula (AI) | | Phase transition points | | | |
|---|---|---|---|---|---|
| R1 | R2 | Cr | SA | N | Iso |
| C2H5 | C2H5 | 60 | | | 112.7 |
| C2H5 | C4H9 | 33 | | | 119 |
| C2H5 | C6H13 | 50 | 77 | | 115 |
| C2H5 | C8H17 | 52 | 103.8 | | 117.5 |
| C3H7 | C3H7 | 83 | | | 154.3 |
| C3H7 | C4H9 | 76 | 96 | | 150 |
| C3H7 | C6H13 | 61 | 126 | | 146 |
| C4H9 | C4H9 | 71 | 120 | | 146 |
| C4H9 | C6H13 | 47 | 133 | | 139 |
| C5H11 | C3H7 | 80 | 122.5 | | 152.4 |
| C5H11 | C4H9 | 52 | 115 | | 136 |
| C5H11 | C6H13 | 50 | 146 | | 150 |
| C6H13 | C3H7 | 66 | 132.3 | | 147.5 |
| C6H13 | C4H9 | 58 | 117 | | 151 |
| C6H13 | C5H11 | 46 | 143.7 | | 146.7 |
| C6H13 | C6H13 | 50 | 145 | | |
| C6H13 | C8H17 | 42 | 145 | | |
| C7H15 | C3H7 | 73 | 137.3 | | 148.8 |
| C7H15 | C5H11 | 46 | 148.2 | | 148.6 |
| C8H17 | C3H7 | 58 | 147.4 | | |
| C8H17 | C5H11 | 67 | 139.5 | | 145.7 |
| C8H17 | C6H13 | 45 | 145.1 | | |

TABLE 2

Compounds of (AII) preferably usable in the present invention and their phase transition points

| In formula (AII) | | Phase transition points | | | |
|---|---|---|---|---|---|
| R7 | R8 | Cr | Sc | Ne | Iso |
| C2H5 | C5H11 | 66 | 63.8 | | 151.1 |
| C2H5 | C6H13 | 62 | 73.3 | | 139.8 |
| C2H5 | C8H17 | 70 | 93.2 | | 139.4 |
| C3H7 | C5H11 | 68 | 89.3 | | 164.4 |
| C3H7 | C7H15 | 73 | 107.6 | | 158.3 |
| C3H7 | C8H17 | 68 | 114.2 | | 152.6 |
| C3H7 | C9H19 | 73 | 120.8 | | 153.1 |
| C4H9 | C8H17 | 55 | 124.6 | | 146.8 |
| C5H11 | C6H13 | 79 | 129.3 | | 157.6 |
| C5H11 | C7H15 | 62 | 136.7 | | 159.9 |
| C5H11 | C8H17 | 56 | 139.7 | | 155.8 |
| C5H11 | C9H19 | 62 | 143.3 | | 155.8 |
| C6H13 | C4H9 | 75 | 116.3 | | 149.4 |
| C6H13 | C7H15 | 72 | 142.1 | | 155.5 |
| C6H13 | C8H17 | 62 | 143.7 | | 151.7 |
| C7H15 | C8H17 | 71 | 150.1 | | 154.8 |

TABLE 3

Compounds of (B, X = H) preferably usable in the present invention and their phase transition points

| R3 | R4 | Phase transition points |
|---|---|---|
| n-C4H9 | n-C7H15 | Cr 53.5 SG 40.5 SF 48.4 SC 63.8 Ne 69.8 Iso |
| n-C5H11 | n-C7H15 | Cr 26.5 SG 35 SF 48 SC 67.5 Ne 68.7 Iso |
| n-C6H13 | n-C7H15 | Cr 34 SH 31.2 SG 44.4 SF 53 SC 74.4 Ne 75.2 Iso |
| n-C7H15 | n-C7H15 | Cr 24 SH 31.5 SG 40.3 SF 53 SC 76.6 Iso |
| n-C8H17 | n-C7H15 | Cr 45 SG 45.4 SF 56.5 SC 80.4 Iso |
| n-C9H19 | n-C7H15 | Cr 42.5 SF 58.5 SC 80.7 Iso |
| n-C10H21 | n-C7H15 | Cr 39.5 SF 62 SC 82.1 Iso |
| n-C11H23 | n-C7H15 | Cr 48.8 SF 63.7 SC 81.4 Iso |
| n-C12H25 | n-C7H15 | Cr 49 SF 67 SC 82.1 Iso |
| n-C4H9 | n-C8H17 | Cr 32.7 SB 57.3 SC 66.8 SA 69.4 Iso |
| n-C5H11 | n-C8H17 | Cr 37.4 SB 52 SC 70.1 Iso |
| n-C6H13 | n-C8H17 | Cr 13.7 SH 15 SG 19 SF 54 SC 76.2 Iso |
| n-C7H15 | n-C8H17 | Cr 27.3 SF 57 SC 77.5 Iso |
| n-C8H17 | n-C8H17 | Cr 34.6 SF 60.2 SC 81.3 Iso |
| n-C9H19 | n-C8H17 | Cr 37.5 SF 61.5 SC 81.4 Iso |
| n-C10H21 | n-C8H17 | Cr 40.8 SF 65.5 SC 82.1 Iso |
| n-C11H23 | n-C8H17 | Cr 47.3 SF 68 SC 82.2 Iso |
| n-C12H25 | n-C8H17 | Cr 46 SF 70.2 SC 82.4 Iso |
| n-C5H11 | n-C9H19 | Cr 42.5 SB 65 SC 72.4 SA 74.5 Iso |
| n-C6H13 | n-C9H19 | Cr 36 SB 64.4 SC 80.5 Iso |
| n-C7H15 | n-C9H19 | Cr 33 SB 64 SC 81.5 Iso |
| n-C8H17 | n-C9H19 | Cr 31.6 SB 66 SC 85.1 Iso |
| n-C9H19 | n-C9H19 | Cr 37.4 SB 69.6 SC 84.9 Iso |
| n-C10H21 | n-C9H19 | Cr 38.6 SB 69.2 SC 86.3 Iso |
| n-C11H23 | n-C9H19 | Cr 40.7 SB 75.4 SC 86 Iso |
| n-C12H25 | n-C9H19 | Cr 43.5 SB 77.8 SC 85.2 Iso |
| n-C5H11 | n-C10H21 | Cr 44.4 SB 66.7 SC 70.4 SA 74.4 Iso |
| n-C6H13 | n-C10H21 | Cr 30 SB 67.6 SC 80 Iso |
| n-C7H15 | n-C10H21 | Cr 41 SB 67.8 SC 80.8 Iso |
| n-C8H17 | n-C10H21 | Cr 34.5 SB 71.2 SC 84.1 Iso |
| n-C9H19 | n-C10H21 | Cr 40.7 SF 72.4 SC 84 Iso |
| n-C10H21 | n-C10H21 | Cr 41.3 SF 75.8 SC 85.4 Iso |
| n-C11H23 | n-C10H21 | Cr 47.6 SF 77.1 SC 85.2 Iso |
| n-C12H25 | n-C10H21 | Cr 48 SF 79.9 SC 86.1 Iso |

TABLE 4

Compounds of (B, X = F) preferably usable in the present invention and their phase transition points

| In formula (B) | | Phase transition points | | | |
|---|---|---|---|---|---|
| R3 | R4 | Cr | SC | SA | Iso |
| C6H13 | C7H15 | 25 | 40.6 | 50.5 | |
| C7H15 | C7H15 | 33 | 40.1 | 50.4 | |
| C8H15 | C7H15 | 26 | 46 | 53.4 | |
| C9H19 | C7H15 | 38 | 45.2 | 63.6 | |
| C8H15 | C8H15 | 35 | 49.9 | 54.8 | |
| C9H19 | C8H15 | 47 | 50.3 | 55.4 | |
| C10H21 | C8H15 | 44 | 53.2 | 56.5 | |
| C7H15 | C9H19 | 35 | 45.6 | 57.6 | |
| C12H25 | C9H19 | 46 | 57.8 | 62.1 | |
| C9H19 | C10H21 | 47 | 57.8 | 61.4 | |
| 6-methylpentyl | C6H13 | 25 | 33.1 | 34.4 | |
| 6-methylpentyl | C7H15 | 19.6 | 34 | 44.8 | |
| 6-methylpentyl | C8H17 | 33.5 | 36.4 | 42.6 | |
| 6-methylpentyl | C9H19 | 27.3 | 35.7 | 45.7 | |
| 9-methyldecyl | C6H13 | 34.5 | 37.9 | 41.2 | |
| 9-methyldecyl | C7H15 | 28.3 | 42.8 | 51 | |
| 9-methyldecyl | C8H19 | 35.2 | 48 | 50.7 | |
| 9-methyldecyl | C9H19 | 28.7 | 54 | 57.4 | |

TABLE 5

Compounds of (C) preferably usable in the present invention and their phase transition points

| R5 | R6 | Phase transition points |
|---|---|---|
| C6H13 | C8H17 | Cr 27.5 SC 44.5 SA 57.5 N 65 Iso |
| C6H13 | C9H19 | Cr 24 SC 43 SA 69.5 N 70.5 Iso |
| C6H13 | C10H21 | Cr 36 SC 57.5 SA 71.5 Iso |
| C7H15 | C9H19 | Cr 32.5 SC 48 SA 72.5 Iso |
| C7H15 | C10H21 | Cr 46 SC 62.5 SA 72 Iso |
| C8H17 | C7H15 | Cr 49 (SC 44) SA 69.5 Iso |
| C8H17 | C8H17 | Cr 28.5 SC 55.5 SA 62 N 68 Iso |
| C8H17 | C9H19 | Cr 33 SC 60 SA 75.5 Iso |
| C8H17 | C10H21 | Cr 37 SC 68.5 SA 73.5 Iso |
| C9H19 | C7H15 | Cr 45.5 SC 51 SA 56.5 N 70 Iso |
| C9H19 | C8H17 | Cr 33 SC 56 SA 65 N 68.5 Iso |
| C10H21 | C7H15 | Cr 53 SC 54.5 N 71.5 Iso |
| C10H21 | C8H17 | Cr 32 SC 59.5 SA 65.5 N 69.5 Iso |
| C11H23 | C7H15 | Cr 55 (SC 54.5) SA 62.5 N 70 Iso |
| C11H23 | C8H17 | Cr 44.5 SC 60 SA 67 N 69 Iso |
| C12H25 | C7H15 | Cr 59.5 (SC 57.5) SA 63 N 71 Iso |
| C12H25 | C8H17 | Cr 42 SC 61.5 SA 68.5 N 70 Iso |

Compounds capable of being added to the composition of the present invention are mentioned below:

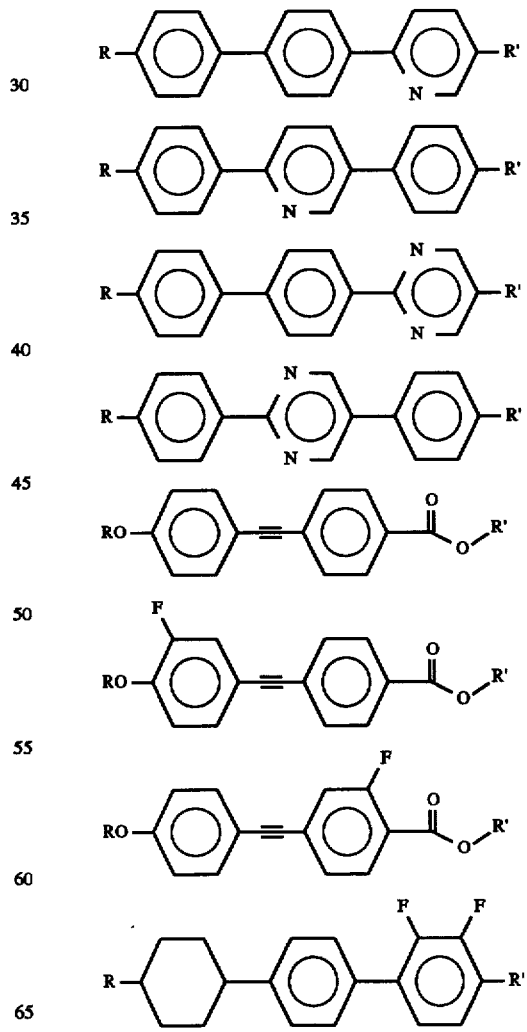

-continued

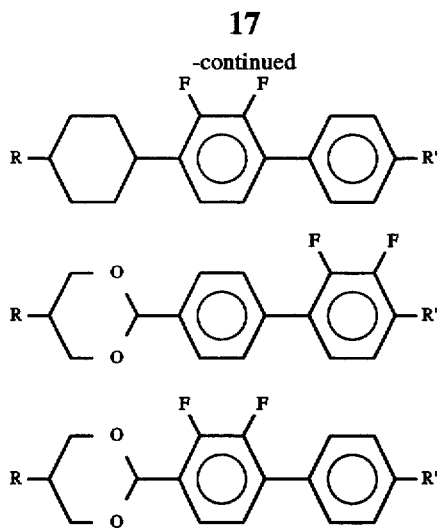

When one kind or more of suitable optically active compounds are adequately added to the composition of the present invention, it is possible to compose practical ferroelectric liquid crystal compositions. Optically active sites of compounds at which addition is possible are illustrates below.

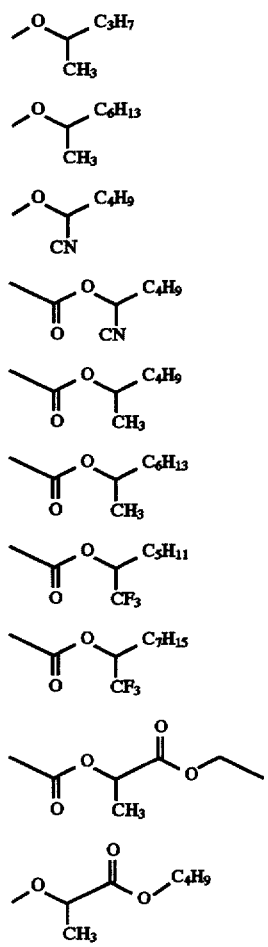

-continued

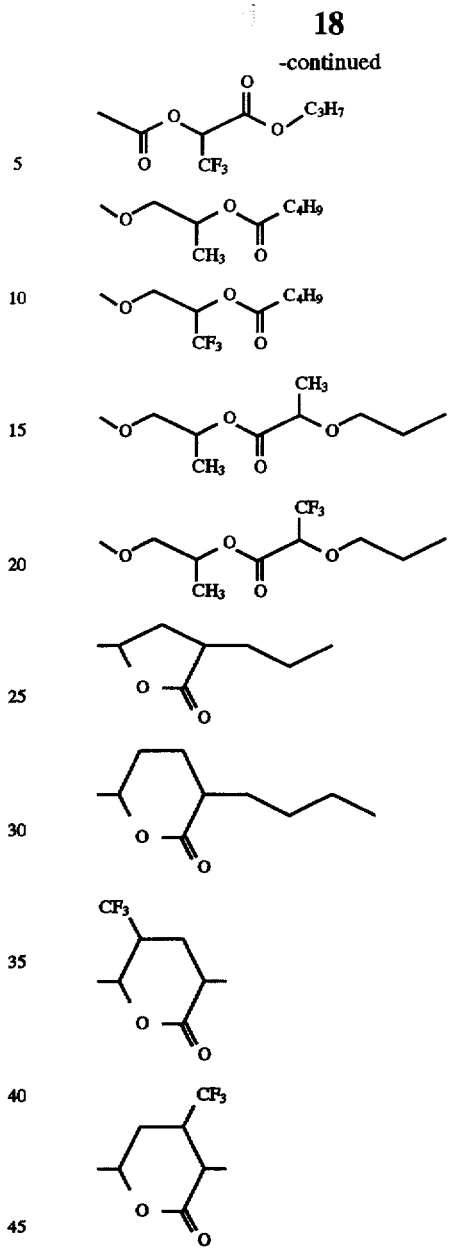

FIG. 1 illustrates a cross-sectional view showing the basic construction of a liquid crystal element using a ferroelectric liquid crystal composition of the present invention. This liquid crystal element consists basically of a pair of insulating substrates 1 and 2 having electro-conductive membranes 3 and 4 as electrodes; a smectic liquid crystal composition 8 intervened between the substrates 1 and 2; a driving means (not shown) for changing over the optical axis of the liquid crystal by selectively applying a voltage onto the electrodes; and a polarizing plate 9 as a means for optically identifying the change-over of the optical axis. In addition, in the figure, 5 refers to an insulating membrane; 6 refers to an alignment-controlling membrane; and 7 refers to a sealing agent.

As the insulating substrates 1 and 2, light-transmitting substrates are used, and glass substrates are usually used. On the insulating substrates, transparent electrodes 3 and 4 of definite pattern of $I_nO_3$, $S_nO_2$, ITO (Indium-Tin Oxide), etc. are formed according to CVD (Chemical Vapor Deposition) method or a spattering method. The membrane thickness of the transparent membranes are preferably 50 to 200 nm.

On the transparent electrodes, an insulating membrane 5 of a membrane thickness of 50 to 200 nm is formed. As the insulating membrane, inorganic thin film such as those of $SiO_2$, SiNx, $Al_2O_3$, $Ta_2O_5$, etc., organic thin film such as those of polyimide, photoresist resin, high molecular liquid crystal, etc. and the like are usable. In the case where the insulating membrane is inorganic thin film, it can be formed according to deposition method, spattering method, CVD method, solution-coating method, etc. Further, in the case of the organic thin film, a solution of an organic substance or a solution of its precursor is coated according to spinner coating method, immersion coating method, screen printing method, roll coating method or the like, followed by curing under a definite condition (heating, light-irradiation, etc.), to form the film. Or, it is also possible to form it according to deposition method, spattering method, CVD method, LB (Langmuir-Blodgett) method, etc. The insulating membrane may be omitted.

On the insulating membrane 5, an alignment-controlling membrane 6 of a membrane thickness of 10 to 100 nm is formed. When the insulating membrane is omitted as described above, the alignment-controlling membrane is formed directly on the electro-conductive membranes 3 and 4. As this alignment-controlling membrane 6, it is possible to use an inorganic or organic membrane. As the inorganic alignment-controlling membrane, silicon oxide, etc. are usable, and as the membrane-forming method, known methods are usable, and for example, oblique deposition method, rotating deposition method, etc. are usable. As the organic alignment-controlling membrane, those of nylon, polyvinyl alcohol, polyimide, etc. are usable, and rubbing is usually carried out thereon. Further, when high molecule liquid crystal or LB membrane is used, it is possible to make alignment by magnetic field or according to spacer edge method, etc. Further, a method of making membrane from $SiO_2$, $SiN_x$, etc. according to spattering method, CVD method, etc. and rubbing it thereon is also usable.

Next, two sheets of insulating substrates 1 and 2 are laminated by the medium of a sealing material 7, followed by filling a smectic liquid crystal composition 8 to prepare a liquid crystal element. As the smectic liquid crystal composition 8, the smectic liquid crystal compositions of the present invention described above in the item (5) or the item (6) are used.

Figure 2:
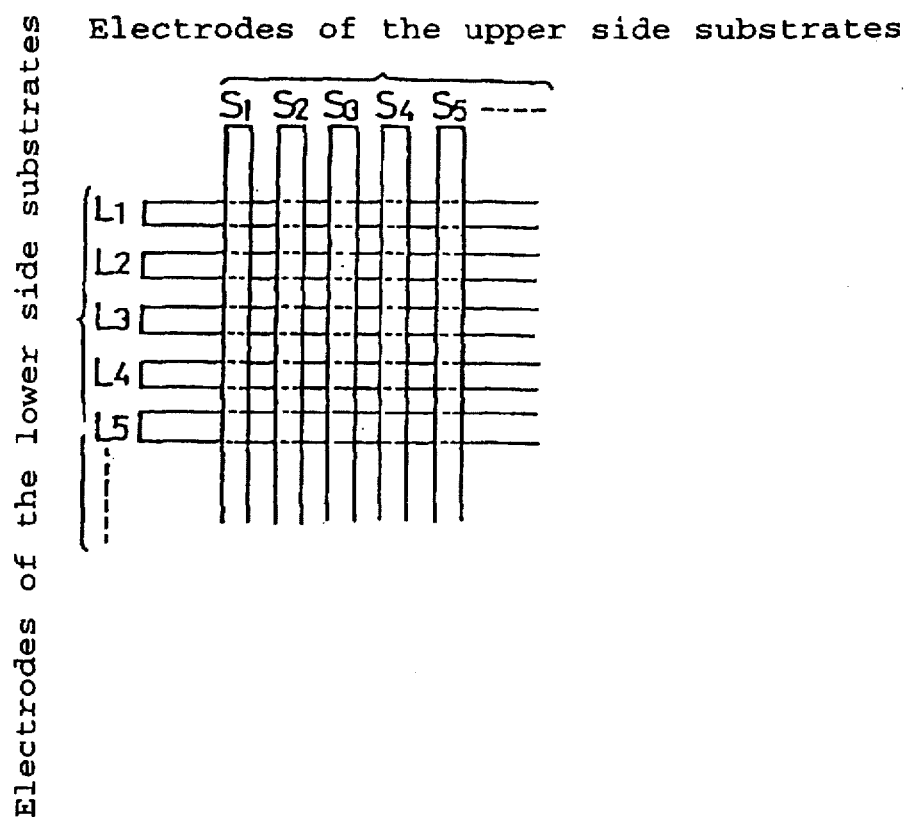
FIG. 2 refers to a view typically illustrating the method for preparing a ferroelectric liquid crystal element of a large capacity using the liquid crystal composition of the present invention.

In the foregoing, explanation in FIG. 1 was made as a switching element of a picture element number 1, but the liquid crystal element of the present invention is applicable to a display device of a large capacity matrix, and in this case, as shown in the typical plan of FIG. 2, the electrode wirings of the upper and lower substrates 1 and 2 are used in combination of matrix type.

Next, the uniaxially aligning treatment method of the ferroelectric liquid crystal element of the present invention will be described.

As the uniaxially aligning treatment method of the aligned membrane in the above liquid crystal element, the most preferred method is a rubbing method. The rubbing method mainly includes those of parallel rubbing, anti-parallel rubbing, one side rubbing, etc. The parallel rubbing refers to a rubbing wherein the upper and lower substrates are rubbed and the rubbing directions are parallel. The antiparallel method refers to a rubbing wherein the upper and lower substrate are rubbed, but the rubbing directions are anti-parallel. The one side rubbing refers to a rubbing wherein only one side substrate of the upper and lower substrates is rubbed. The most preferable, uniaxially aligning treatment method for obtaining uniform alignment in the present invention, is a method of combining a cell treated according to parallel rubbing, with a ferroelectric liquid crystal having INAC phase sequence. In this case, a helical structure is present in the nematic phase, but the aligning direction of molecules is regulated from the both sides of the upper and lower substrates; hence a uniform alignment is liable to be obtained in the nematic phase; thus, when the temperature is lowered from the state toward smectic A phase, and chiral smectic C phase, a uniform alignment having a uniform direction of layer nominal is easily obtained.

However, even in the ferroelectric liquid crystal element of parallel rubbing, the aligning state formed in chiral smectic C phase is never one. The cause of not totally becoming uniform is the following two:

One cause is directed to bend of smectic layer.

Figure 3:
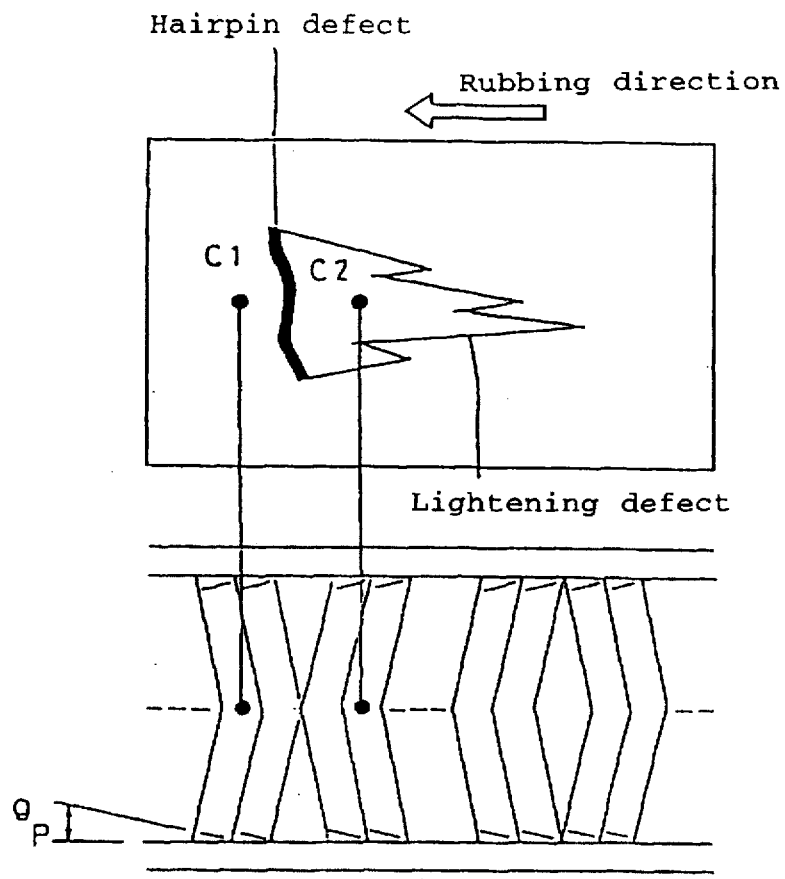
FIG. 3 refers to a view for illustrating the C1 alignment and C2 alignment of a ferroelectric liquid crystal element.

It is well known that ferroelectric liquid crystal cell shows a bend layer structure (Chevron layer structure), but as shown in FIG. 3, two regions can be present. Kanbe et al named them as C1 and C2 in view of relationship with pretilt.

Another cause consists in uniform (U) and twist (T).

Uniform is an alignment exhibiting dark state and twist is an alignment exhibiting no dark state. Koden et al. reported that three alignments of C1U (C1 uniform), C1T (C1 twist) and C2 were obtained in the ferroelectric liquid crystal cell of parallel rubbing using a high pretilt aligned membrane (M. Koden et al., Jpn. J. Appl. Phys., 30, L 1823 (1991).

Figure 4:
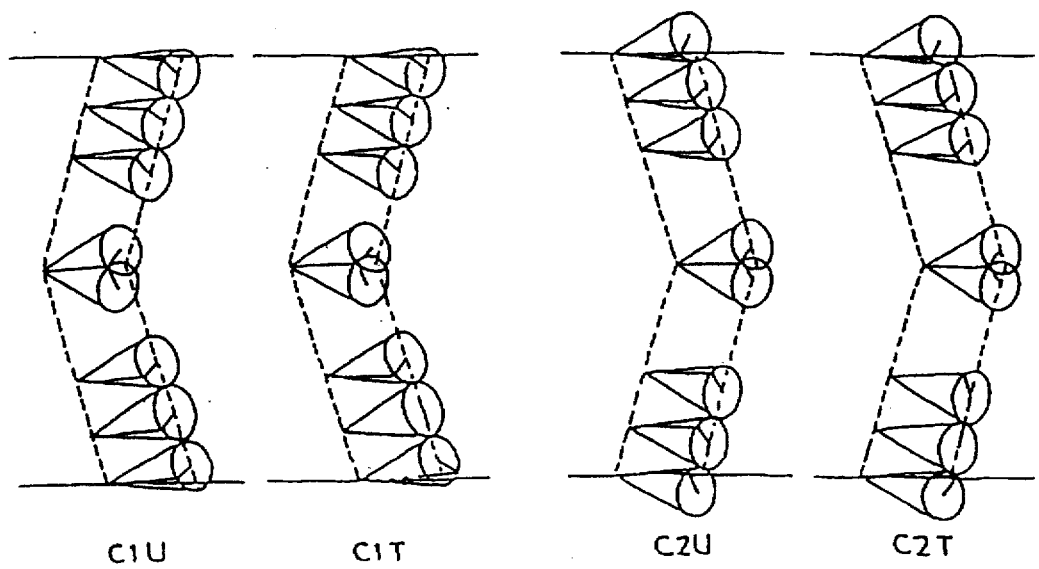
FIG. 4 refers to a view illustrating the models of the molecular alignments of four aligned states of a ferroelectric liquid crystal element.

Further, Tagawa et al. reported that as a result of detailed studies, four aligned states of C1U, C1T, C2U (C2 uniform) and C2T (C2 twist) were obtained in a ferroelectric liquid cell of parallel rubbing of a pretilt angle of 5° or less (A. Tagawa et al., Japan Display '92, 519(1992). FIG. 4 shows the molecular alignment of these aligned states.

The present inventors have found that when four aligned states obtained in a ferroelectric liquid crystal cell having a negative dielectric anisotropy value are compared, C1U and C1T alignments are difficult to carry out switching and there is no dark state in the case of C1t alignment; hence even when switching is carried out, driving is difficult, and in the case of C1T alignment, there is no dark state; hence even when switching is carried out, a good contrast cannot be obtained, whereas C2U alignment affords a good switching characteristic and contrast, and further, C2T alignment exhibits no dark level at the time of applying no electric field, but when a liquid crystal material has a negative dielectric anisotropy, dark level is exhibited as in uniform alignment at the time of applying a suitable bias electric field; hence even in the case of C2T alignment, a good switching characteristic and contrast are obtained.

The appearance proportion of C1 and C2 alignments is related to pretilt angle, and C2 state can occur when the pretilt angle is in the range of 0° to 15°. When the pretilt angle is high, C2 state is only a state of exhibiting extinction site, as reported by Koden et al, and this is rather preferable. However, with increase of pretilt angle, there is a tendency that C1 alignment is liable to occur, rather than C2 alignment; hence the pretilt angle is preferred to be 10° or less.

Next, the driving method will be described.

The liquid crystal element using the smectic liquid crystal composition of the present invention has a large negative dielectric anisotropy value; hence it is very suitable to τ-Vmin mode.

Figure 5:
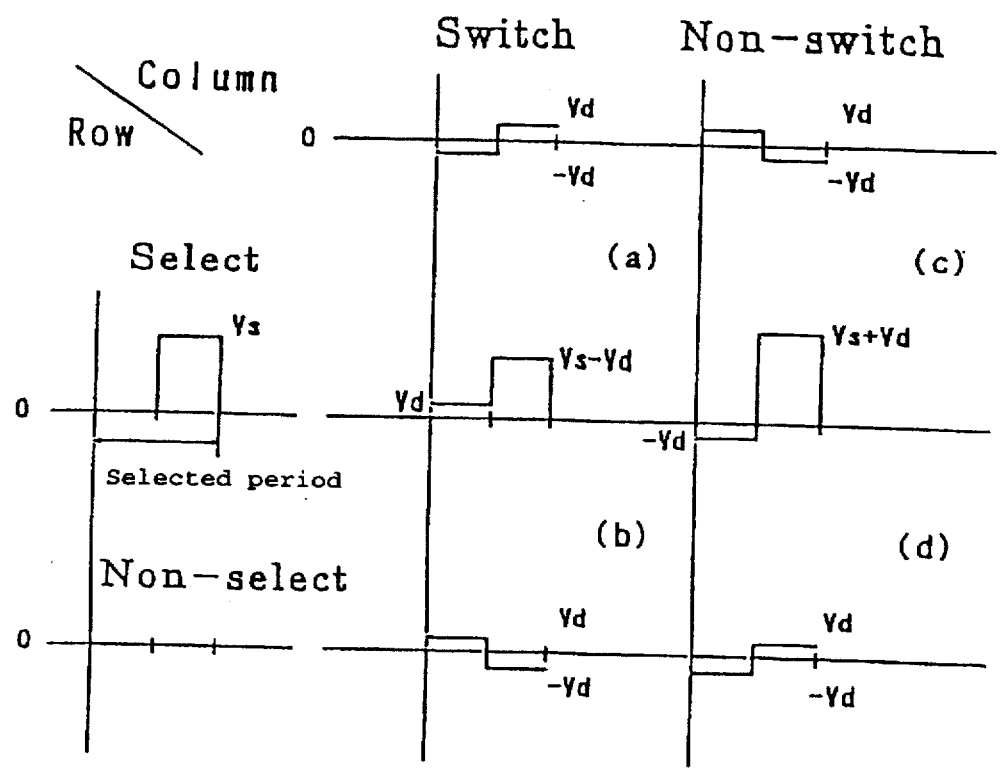
FIG. 5 refers to a view illustrating a driving waveform (A) driving a ferroelectric liquid crystal element by the use of the τ-V characteristic of a ferroelectric liquid crystal material.

Surguy et al. reported Joers/Alvey driving method using a scheme (A) shown in FIG. 5, as a driving method for τ-V min mode (P. W. H. Surguy et al., Ferroelectrics, 122, 63 (1991). Further, Molvern driving method (WO 92/02925 (PCT)), one example of which is a scheme (B) shown in FIG. 6, is a driving method devised so that the main pulse width can be varied to an optional length, as shown in FIG. 7, differently from Joers/Alvey driving method according to the driving scheme (A) using a 0V part of one-time slat and a not 0V part of one time slot; and the voltage-applying timings are overlapped between the electrodes and the line address time is shortened; hence it is one of preferable driving methods.

The driving method used for such a $\tau$-Vmin mode is characterized by the following points:

According to these driving methods, when the first pulse voltage V1 and successively the second pulse voltage 2, or the first pulse voltage $-$V1 and successively the second pulse voltage $-$V2, are applied onto the pixels on the selected scanning electrode, then the ferroelectric liquid crystal molecules are brought about into a stable state, or another stable state, by the polarity of the applied voltage, without relying on the stable state prior to the voltage application, And when the first pulse voltage 3 and successively the second pulse voltage V4 or the first pulse voltage $-$V3 and successively the second pulse voltage $-$V4 are applied onto the same pixels, then the stable state of the ferroelectric liquid crystal molecules prior to the voltage application is retained, wherein the voltages V1, V2, V3 and V4 used are in the relation of 0<V2<V4 and V2–V1<V4–V3. Namely, in the initial two-time slot during the selected period, when the scheme applied to rewriting is compared with the scheme applied to retaining, the second pulse voltage is higher in the latter case, and the voltage difference between the first pulse and the second pulse is also higher in the latter case.

Figure 6:
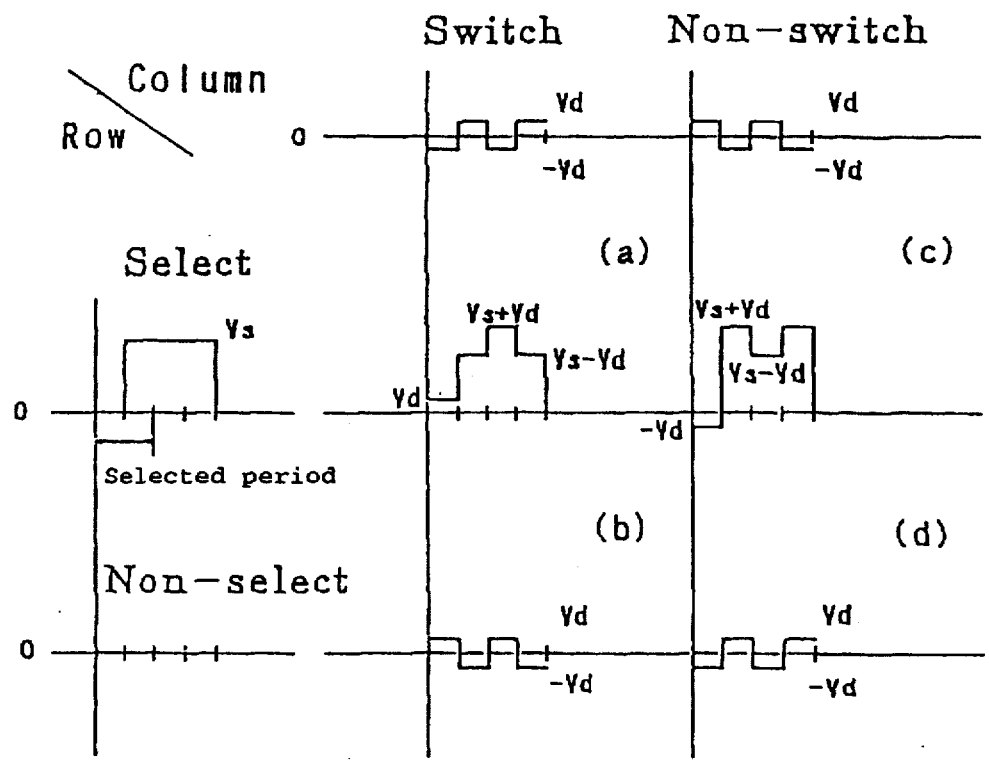
FIG. 6 refers to a view illustrating a driving waveform (B) driving a ferroelectric liquid crystal element by the use of the τ-V characteristic of a ferroelectric liquid crystal material.
Figure 7:
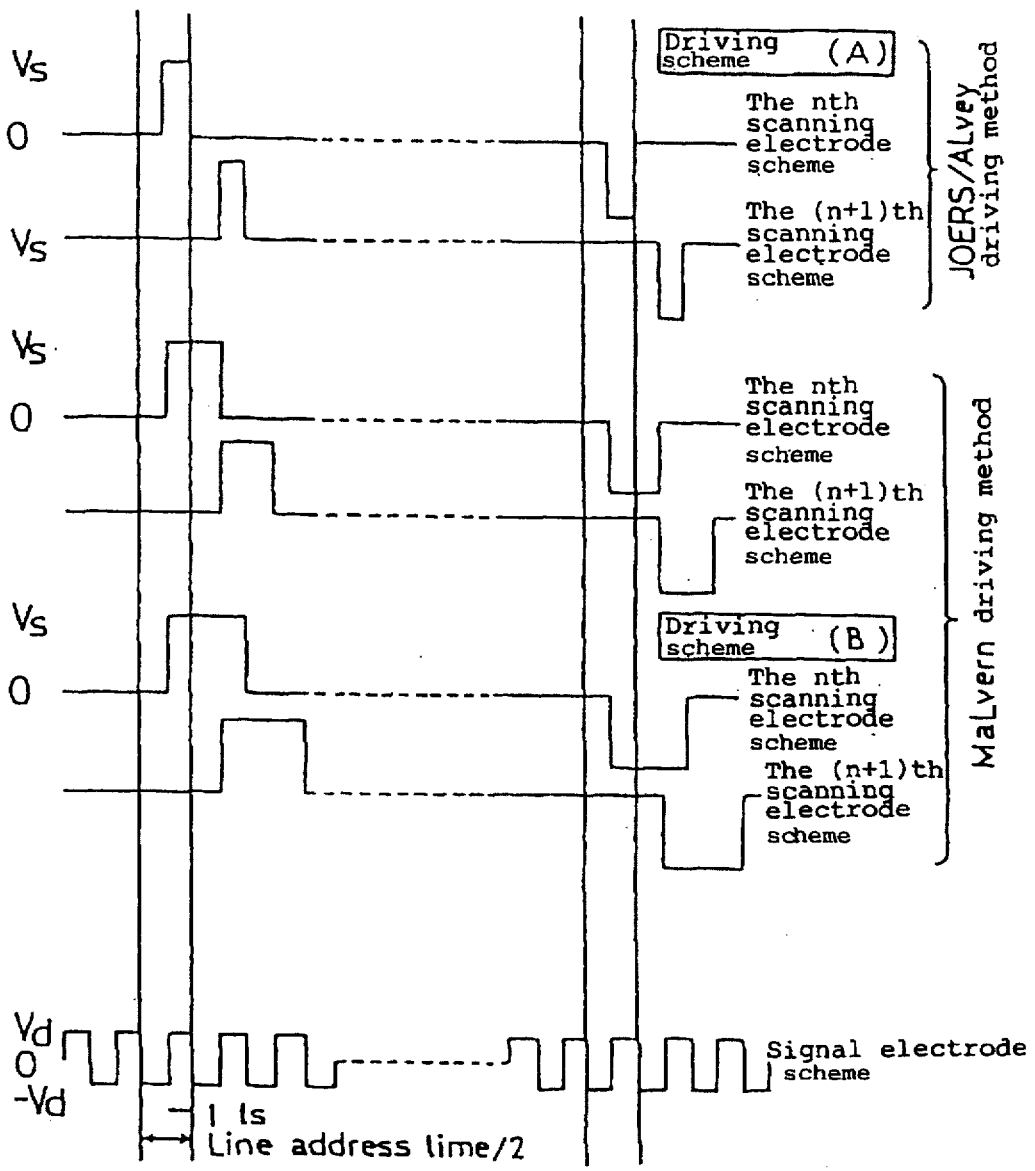
FIG. 7 refers to a view illustrating the driving waveform driving a ferroelectric liquid crystal element by the use of the τ-V characteristic of a ferroelectric liquid crystal material.
Figure 8:
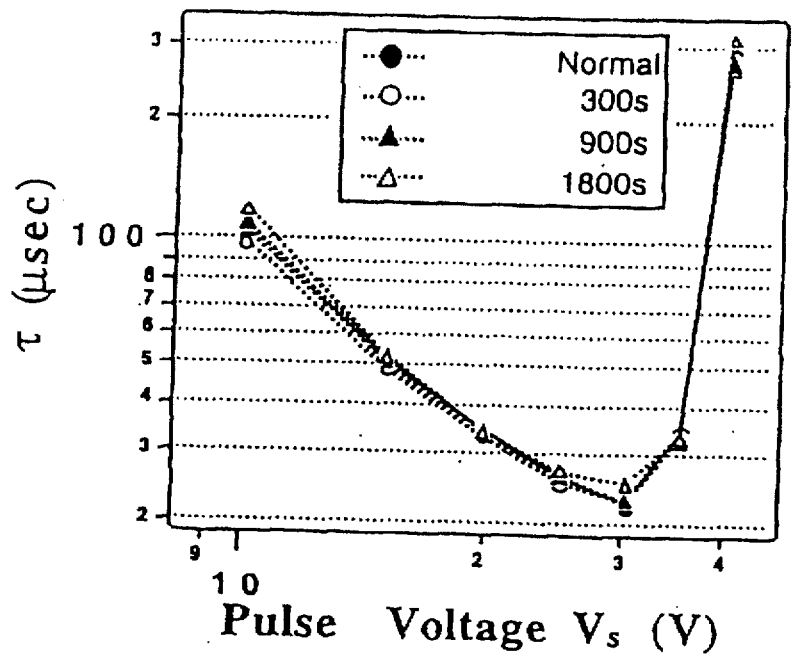
FIG. 8 refers to a view illustrating the temperature-dependency of τ-Vmin at the time of ultraviolet rays exposure of the respective compositions of Example 22 of the present invention and Reference example.
Figure 8:
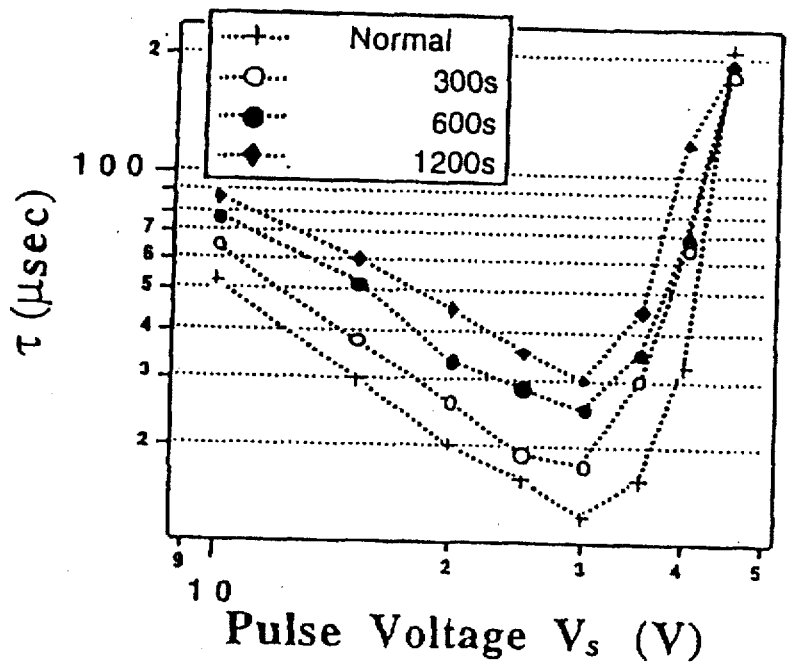

For example, as to such V1, V2, V3 and V4, in both the cases of the driving scheme (A) in FIG. 5 and the driving scheme (B) of FIG. 6, $V1=Vd$, $V2=Vs-Vd$, $V3=-Vd$ and $V4=Vs+Vd$ The voltage Vmin in the $\tau$-V characteristic of liquid crystal materials is directly related to the maximum value of voltage applied at the time of driving.

In view or the appliable voltage of the driving circuit used for the driving, ferroelectric liquid crystal materials having a Vmin of 60 V or lower are required, while those having a Vmin of 40 V or lower are required for using a driving circuit wherein a conventional IC driver is used, and the smectic liquid crystal composition of the present invention easily satisfies the requirement.

Further, in the $\tau$-Vmin mode driving the liquid crystal element using the smectic liquid crystal composition of the present invention, for example according to a method of modifying the element structure such as cell gap, electrode shape, etc., different regions of driving characteristics are optionally provided and thereby a scheme applied to rewriting of a specified part in the pixels can be used as a scheme for retaining at another part in the same pixels, or a scheme applied to retaining of a specified part in the pixels can be used as a scheme applied to rewriting at another part in the same pixels; hence it is possible to carry out gray scale.

In addition, in the description of the present invention, as an example of very preferable methods for applying the liquid crystal element using the smectic liquid crystal composition of the present invention, parallel rubbing treatment, specified driving method, etc. have been mentioned, but, of course, the present invention is not limited thereto, but, of course, it is also applicable to other types of liquid crystal elements and driving methods.

The present invention will be described in more detail, by Examples, but it is not limited thereto.

The various measurements in the present invention were carried out according to the following methods:

The phase transition points were measured by placing a sample on a slide glass, covering it by a cover glass, placing it on a hot plate, elevating the temperature at a rate of 1° C./min and observing under a polarized microscope. The melting point was measured by using a differential scanning calorimetry (DSC) and elevating the temperature at a rate of 1° C./min. The dielectric anisotropy ($\Delta\epsilon$) was measured by filling the respective compositions in a cell of 2 µm gap, whose capacity has been measured in advance and on which a homotropically aligning agent and a cell of an electrode distance of 2 µm subjected to homogeneously aligning treatment, measuring the capacities of the respective cells at 25° C. 1V and 10 KHz by means of LCR meter and calculating.

Comparative example 1

The $\Delta\epsilon$ values of compounds (C) and (D) were measured. Since either components are difficult to measure alone, compositions of the compounds and compound (B-1) were prepared, and the respective dielectric constants were measured at a temperature lower by 10° C. than the upper limit temperatures of SC phases at the respective concentrations

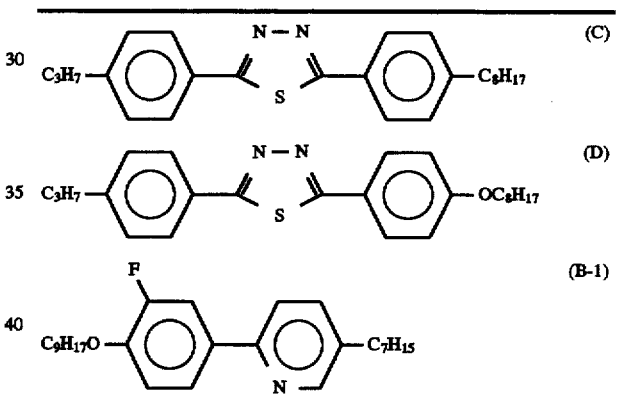

| Compound concentration | (C) | | | (D) | | |
|---|---|---|---|---|---|---|
| (wt. %) | $\epsilon\perp$ | $\epsilon//$ | $\Delta\epsilon$ | $\epsilon\perp$ | $\epsilon//$ | $\Delta\epsilon$ |
| 0 | | | −2.7 | | | −2.7 |
| 10 | 7.3 | 4.4 | −2.9 | 7.3 | 4.6 | −2.7 |
| 30 | 7.1 | 4 | −3.1 | 7.2 | 4.5 | −2.7 |
| 100 | | | −4.3 | | | −2.7 |

$\epsilon\perp$ is an anisotropy quantity in which the dielectric constant along the short axe of molecule is represented by $\Delta\epsilon=\epsilon//-\epsilon\perp$, and $\epsilon//$ is an anisotropy quantity in which the dielectric constant along the long axe of molecule is represented by the above equation. The concentrations of the compounds are those based upon compound (C) or compound (D).

Comparative example 2

The $\Delta\epsilon$ values of compounds (E) and (F) were measured.

Since either compounds are difficult to measure alone, compositions of the compounds and compound (G) were prepared, and the respective dielectric constants were measured at a temperature lower by 10° C. than the upper limit temperature of SC phase in the respective concentrations.

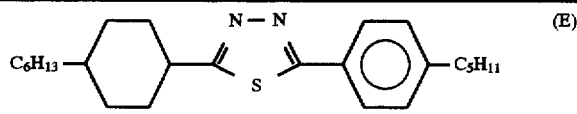
(E)

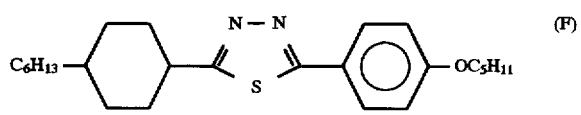
(F)

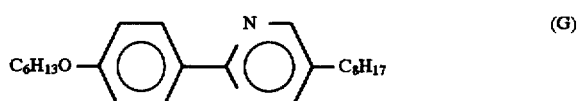
(G)

| Compound concentration (wt. %) | 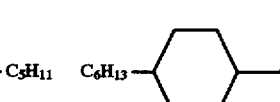 $\epsilon\perp$ | $\epsilon//$ | $\Delta\epsilon$ | 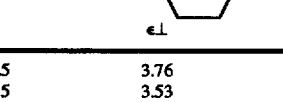 $\epsilon\perp$ | $\epsilon//$ | $\Delta\epsilon$ |
|---|---|---|---|---|---|---|
| 10 | 3.52 | 3.78 | −0.25 | 3.76 | 3.72 | 0.04 |
| 20 | 3.44 | 4.19 | −0.75 | 3.53 | 4.02 | −0.48 |
| 30 | 3.75 | 5.01 | −1.26 | 3.56 | 4.43 | −0.87 |
| 40 | 3.65 | 5.64 | −1.98 | 3.61 | 4.92 | −1.32 |
| * | | | −5.34 | | | −4.01 |

*: Values obtained by extrapolating to 100%

$\epsilon\perp$ anisotropy quantity obtained by expressing the dielectric constant in the short axe direction of molecule by $\Delta\epsilon = \epsilon// - \epsilon\perp$, is an anisotropy quantity obtained by expressing the dielectric constant in the long axe direction of molecule by the above equation. The concentrations of the compounds are those based upon compound (E) or (F).

Phase transition points in the respective concentrations of composition using compound (E)

| Compound concentration wt % | Phase transition points | | | | | $\epsilon$ measurement temperature (° C.) |
|---|---|---|---|---|---|---|
| | Cr | Sc | SA | N | I | |
| 10 | 19 | 57 | 60.1 | | 73.1 | 47 |
| 20 | 18 | 62 | | | 80.8 | 52 |
| 30 | 19 | 67.5 | | | 89.7 | 57.5 |
| 40 | 18 | 73.7 | | | 98.9 | 63.7 |

Phase transition points in the respective concentrations of composition using compound (F)

| Compound concentration wt % | Phase transition points | | | | | $\epsilon$ measurement temperature (°C.) |
|---|---|---|---|---|---|---|
| | Cr | Sc | SA | N | I | |
| 10 | 12 | 47.8 | 61.5 | | 70.5 | 37.8 |
| 20 | 11 | 47.1 | 65.9 | | 75.5 | 37.1 |
| 30 | 18 | 47 | 71.4 | | 81.5 | 37 |
| 40 | 11 | 47.8 | 78.2 | | 88.2 | 37.3 |

Comparative example 3

In order to measure the characteristics of thiadiazole compound (H) having only phenyl rings, a composition obtained by combining this compound with a compound (B) of the present invention was prepared.

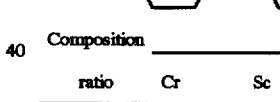
(H)

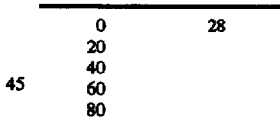
(I)

| Composition ratio | Phase transition point | | | | |
|---|---|---|---|---|---|
| | Cr | Sc | SA | N | I |
| 0 | 28 | | 44.5 | 57.5 | 65 |
| 20 | | | 60.2 | 64 | 77.9 |
| 40 | | | 70.9 | | 92.6 |
| 60 | | | 84.1 | | 110.9 |
| 80 | | | 102.9 | | 133.1 |
| 100 | 79 | | 129.3 | | 157.6 |

The composition ratio is based upon thiadiazole compound (H).

In view of this phase figure, the usable concentration of thiadiazole in the case where compound (H) is used, is at most 20% or less. No effective composition could be prepared.

EXAMPLE 1

A composition consisting of the compound of the present invention (J) and the compound of the present invention (I) was prepared. The phase transition points in the respective concentrations, the table of dielectric constant and Figure are shown below:

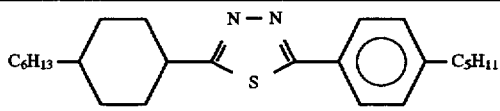

(J)

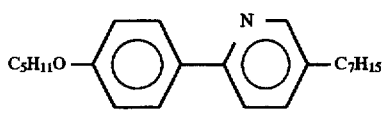

(I)

| Compo-sition ratio | Phase transition point | | | | | | Dielectric constant | | |
|---|---|---|---|---|---|---|---|---|---|
| | Cr | Sx | SC | SA | N | I | ε⊥ | ε// | Δε |
| 0 | 26.5 | 48 | 67.5 | | | 68.7 | | | 1 |
| 20 | −7 | 12 | 70.4 | 73.3 | | 78.6 | 4.8 | 3.3 | −1.5 |
| 40 | −32 | −3 | 70.1 | 84 | | 91.2 | 7.5 | 5.3 | −2.2 |
| 60 | −11 | | 66.7 | 99.1 | | 105.6 | 8.3 | 3.2 | −5.1 |
| 80 | 26 | | 59.1 | 118.4 | | 125.2 | 10.5 | 3.3 | −7.2 |
| 100 | 46 | | | 143.7 | | 146.7 | | | −9 |

In a broad concentration region, SA phase in a sufficient temperature region is exhibited. Nematic phase, too, is exhibited; thus, a phase sequence necessary for alignment is furnished. Further, as an unexpected effectiveness, reduction of melting point is observed. This effectiveness of melting point in other words, broadening of SC phase toward below results in broadening of driving and storage temperature range, and this is practically preferable.

As to Δε, −2 or less as a necessary condition is realized in a broad range.

A particularly preferable concentration range is 30 to 70%.

EXAMPLE 2

2-(4-pentylcyclohexyl)-5-(4-pentylphenyl)thiadiazole 25% by weight 2-(4-propylcyclohexyl)-5-(4-pentylphenyl)thiadiazole 35% by weight 2-(4-pentyloxyphenyl)-5-heptylpyrimidine 40% by weight Phase transition points:

From room temperature, Sc 70 SA 89 Ne 109 Iso

EXAMPLE 3

2-(4-ethylcyclohexyl)-5-(4-butylphenyl)thiadiazole 20% by weight 2-(4-ethylcyclohexyl)-5-(4-octylphenyl)thiadiazole 10% by weight 2-(4-propylcyclohexyl)-5-(4-pentylphenyl)thiadiazole 30% by weight 2-(4-pentyloxyphenyl)-5-heptylpyrimidine 40% by weight Phase transition points:

From room temperature, Sc 58 SA 66 Ne 97 Iso

EXAMPLE 4

2-(4-ethylcyclohexyl)-5-(4-butylphenyl)thiadiazole 5% by weight 2-(4-ethylcyclohexyl)-5-(4-octylphenyl)thiadiazole 15% by weight 2-(4-propylcyclohexyl)-5-(4-pentylphenyl)thiadiazole 40% by weight 2-(4-pentyloxyphenyl)-5-heptylpyrimidine 40% by weight Phase transition points:

From room temperature, Sc 62 SA 78 Ne 101 Iso

EXAMPLE 5

2-(4-ethylcyclohexyl)-5-(4-butylphenyl)thiadiazole 5% by weight 2-(4-ethylcyclohexyl)-5-(4-octylphenyl)thiadiazole 10% by weight 2-(4-propylcyclohexyl)-5-(4-pentylphenyl)thiadiazole 45% by weight 2-(4-pentyloxyphenyl)-5-heptylpyrimidine 40% by weight Phase transition points From room temperatures Sc 64 SA 78 Ne 104 Iso

EXAMPLE 6

2-(4-propylcyclohexyl)-5-(4-pentylphenyl)thiadiazole 65% by weight 2-(4-hexylcyclohexyl)-5-(4-pentylphenyl)thiadiazole 15% by weight 2-(4-pentyloxyphenyl)-5-heptylpyrimidine 6% by weight 2-(4-heptyloxyphenyl)-5-heptylpyrimidine 7% by weight 2-(4-hexyloxyphenyl)-5-octylpyrimidine 7% by weight Phase transition points:

From room temperature, Sc 69 SA 104.5 Ne 128.7 Iso

EXAMPLE 7

A smectic C liquid crystal mixture (a) having the following composition was prepared:

2-(4-octylphenyl)-5-(4-pentylphenyl)thiadiazole 20% by weight 2-(4-hexyltranscyclohexyl)-5-(4-pentylphenyl)thiadiazole 30% by weight 2-(4-octyloxyphenyl)-5-octylpyridine 50% by weight The above composition (a) exhibited the following phase transition points:

Cr −26° C. SC 90.4° C. SA 102.7° C. N 103.0° C. Iso

EXAMPLE 8

A smectic C liquid crystal mixture (b) having the following composition was prepared:

2-(4-octylphenyl)-5-(4-ethylphenyl)thiadiazole 15% by weight 2-(4-hexyltranscyclohexyl)-5-(4-pentylphenyl) thiadiazole 35% by weight 2-(4-butyloxyphenyl)-5-heptylpyridine 50% by weight The above composition (b) exhibited the following phase transition points:

Cr −31° C. SC 72.9° C. SA 86.0° C. N 98.0° C. Iso

EXAMPLE 9

A smectic C liquid crystal mixture (c) having the following composition was prepared:

2-(4-octylphenyl)-5-(4-ethylphenyl)thiadiazole 5% by weight 2-(4-hexyltranscyclohexyl)-5-(4-pentylphenyl) thiadiazole 45% by weight 2-(4-butyloxyphenyl)-5-heptylpyridine 50% by weight The above composition (c) exhibited the following phase transition points:

Cr −22° C. SC 70.3° C. SA 89.5° C. N 98.3° C. Iso

EXAMPLE 10

A smectic C liquid crystal mixture (d) having the following composition was prepared:

2-(4-octylphenyl)-5-(4-ethylphenyl)thiadiazole 25% by weight 2-(4-hexyltranscyclohexyl)-5-(4-pentylphenyl) thiadiazole 25% by weight 2-(3-fluoro-4-octyloxyphenyl)-5-octylpyridine 50% by weight The above composition (d) exhibited the following phase transition points:

Cr −25° C. SC 67.2° C. SA 87.8° C. N 92.2° C. Iso

EXAMPLE 11

A smectic C liquid crystal mixture (e) having the following composition was prepared:

2-(4-hexylphenyl)-5-(4-propylphenyl)thiadiazole 20% by weight 2-(4-hexyltranscyclohexyl)-5-(4-octylphenyl)thiadiazole 40% by weight 2-(4-butyloxyphenyl)-5-heptylpyridine 40% by weight The above composition (e) exhibited the following phase transition points:

Cr −9° C. SC 71.7° C. SA 89.5° C. N 106.1° C. Iso

EXAMPLE 12

A smectic C liquid crystal mixture (f) having the following composition was prepared:

2-(4-hexylphenyl)-5-(4-propylphenyl)thiadiazole 15% by weight 2-(4-hexyltranscyclohexyl)-5-(4-octylphenyl)thiadiazole 40% by weight 2-(4-hexyloxyphenyl)-5-pentylpyridine 45% by weight The above composition (f) exhibited the following phase transition points:

Cr −34° C. SC 80.8° C. SA 99.8° C. N 104.7° C. Iso

EXAMPLE 13

A smectic C liquid crystal mixture (g) having the following composition was prepared:

2-(4-nonylphenyl)-5-(4-propylphenyl)thiadiazole 20% by weight 2-(4-hexyltranscyclohexyl)-5-4-(octylphenyl)thiadiazole 35% by weight 2-(4-heptyloxyphenyl)-5-heptylpyridine 45% by weight The above composition (g) exhibited the following phase transition points:

Cr −17° C. SC 84.8° C. SA 101.8° C. N 105.8° C. Iso

EXAMPLE 14

A smectic C liquid crystal mixture (h) having the following composition was prepared:

2-(4-octylphenyl)-5-(4-ethylphenyl)thiadiazole 5% by weight 2-(4-hexyltranscyclohexyl)-5-(4-pentylphenyl) thiadiazole 45% by weight 2-(4-heptyloxyphenyl)-5-heptylpyridine 50% by weight The above composition (h) exhibited the following phase transition points:

Cr −22° C. SX −8° C. SC 70.3° C. SA 89.9° C. N 98.9° C. Iso

EXAMPLE 15

A smectic C liquid crystal composition (i) having the following composition was prepared:

2-(4-octylphenyl)-5-(4-ethylphenyl)thiadiazole 15% by weight 2-(4-hexyltranscyclohexyl)-5-(4-pentylphenyl) thiadiazole 35% by weight 2-(4-pentyloxyphenyl)-5-heptylpyridine 50% by weight The above composition (i) exhibited the following phase transition points:

Cr −32° C. SX −10.0° C. SC 73.4° C. SA 86.1° C. N 98.2° C. Iso

EXAMPLE 16

A. smectic C liquid crystal mixture (j) having the following composition was prepared:

2-(4-pentylphenyl)-5-(4-propylphenyl)thiadiazole 15% by weight 2-(4-hexyltranscyclohexyl)-5-(4-pentylphenyl) thiadiazole 35% by weight 2-(4-pentyloxyphenyl)-5-heptylpyridine 50% by weight The above composition (j) exhibited the following phase transition points:

Cr <−60° C. SC −11.0° C. SC 76.5° C. SA 84.7° C. N 101.0° C. Iso

EXAMPLE 17

Optically active compounds were added to the composition (c) of Example 9 and the following composition was prepared:

Composition (c) 97 wt %

2 wt %

1 wt %

The characteristics of the resulting ferroelectric liquid crystal were as follows:
Phase transition points:
Cr −12 SC* 68.5 SA 87.2 N* 96.7 Iso
Tilt angle 21.6 deg (25° C.)
Ps 4.5 nC/cm$^2$ (25° C.)
Δε −4.1
τ 41 μsec
Emin 19 V/μm
τ$_{min}$ 21 μsec
(CR 63:1)

As described above, the composition of the present invention exhibits superior characteristics.

Comparative example

The compositions described in Examples 1 and 2 of Japanese patent application No. Hei 6-146295, preciously filed by the present inventors have the following components and characteristics:

The characteristics of the ferroelectric liquid crystal were as follows:
Phase transition points
Cr −28 SC* 73.0 SA 76.2 N* 85.9 Iso
Tilt angle 32.6 deg
Ps 4.2 nC/cm$^2$
Δε −4.6
τ 85 μsec
E$_{min}$ 21 V/μm
τ$_{min}$ 50 μsec The composition was inferior in the alignment, as compared with that of Example 12.

EXAMPLE 18

Optically active compounds were added to the composition (h) of Example 14 and the following composition (l) was prepared:

|      |       | R3/R5  | R4/R6  | Concentration |
|------|-------|--------|--------|---------------|
| (AII)|       | C8H17  | C3H7   | 5             |
|      |       | C8H17  | C4H9   | 10            |
|      |       | C8H17  | C5H11  | 15            |
|      |       | C6H13  | C3H7   | 10            |
| (B)  | X = F | C7H15  | C7H15  | 20            |
|      | X = F | C8H17  | C7H15  | 20            |
|      | X = F | C9H19  | C7H15  | 15            |
|      | X = F | C8H17  | C8H17  | 5             |

Composition (Reference example a) 97 wt %

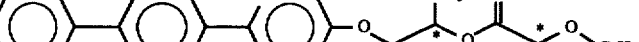

2 wt %

1 wt %

| Composition (h) | 98.5 wt % |
|---|---|
|  | 1.0 wt % |
| | 0.5 wt % |

The characteristics of the resulting ferroelectric liquid crystals were as follows:

Phase transition points:
Cr −22° C. SX −8.0 SC* 68.0° C. SA 87.81° C. N* 97.8° C. Iso

EXAMPLE 19

Optically active compounds were add to the composition (i) of Example 15 and the following composition (m) was prepared:

| Composition (i) | 98.5 wt % |
|---|---|
|  | 1.0 wt % |
| | 0.5 wt % |

The characteristics of the ferroelectric liquid crystal were as follows:

Phase transition points:

Cr −32° C. SX −10.0 SC* 70.8° C. SA 84.2° C. N* 97.2° C. Iso

EXAMPLE 20

Optically active compounds were added to the composition (j) of Example 16, and the following composition (n) was prepared:

| Compostion (j) | 98.5 wt % |
|---|---|
| 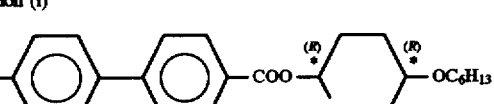 | 1.0 wt % |
|  | 0.5 wt % |

The characteristics of the ferroelectric liquid crystals were as follows:

Phase transition points:
Cr <–60° C. SX –11.0 SC* 73.5° C. SA 82.5° C. N* 99.5° C. Iso Reference example A. composition (o) consisting only of (AII) was prepared:

2-(4-propylphenyl)-5-(4-hexylphenyl)thiadiazole 25% by weight 2-(4-propylphenyl)-5-(4-octylphenyl)thiadiazole 12.5% by weight 2-(4-pentylphenyl)-5-(4-heptylphenyl)thiadiazole 12.5% by weight 2-(4-pentylphenyl)-5-(4-octylphenyl)thiadiazole 25% by weight 2-(4-hexylphenyl)-5-(4-octylphenyl)thiadiazole 25% by weight Its phase transition points were as follows:
Cr 42.5 SC 126.0 Ne 154.4 Iso As described above, the composition consisting only of (AII) had drawbacks that its melting point was high, SA phase for alignment was defective, etc.

EXAMPLE 21

Using the composition of a Reference example, the composition of the present invention and an optically active compound, the following composition was prepared:

| | |
|---|---|
| Composition (i) of Example 15 | 78% by weight |
| Composition of Reference example (o) | 20% by weight |
| | 2% by weight |

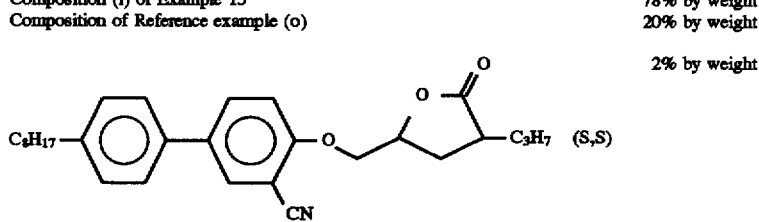

The phase transition points were as follows:
From, room temperature, SC* 78 SA 88 Ne* 105 Iso

EXAMPLE 22

A composition consisting of 2-(4-ethylcyclohexyl)-5-(4-octylphenyl)thiadiazole 40% by weight 2-(4-hexylcyclohexyl)-5-(4-pentylphenyl)thiadiazole 10% by weight and 5-heptyl-2-(4-pentyloxyphenyl)pyridine 50% by weight was prepared, and the following compound (1.5% by weight) was added to the above composition:

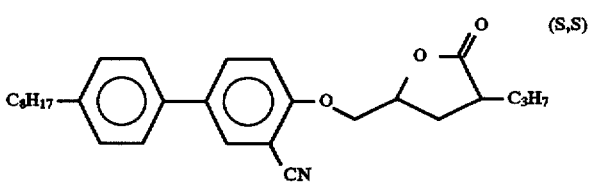

to prepare a ferroelectric liquid crystal composition. Ultraviolet rays of an exposure intensity of 42.8 mWcm-2 (λ=360 nm) were irradiated onto the composition.

Phase transition points shown by the cell, before the irradiation and those after 1,800 seconds were compared.

Before irradiation: Sc* –53.1 SA 74.5 Ne* 83.1 Iso
After irradiation: Sc* –53.0 SA 74.9 Ne* 83.4 Iso Reference Example A composition consisting of 2-(4-ethylphenyl)-5-(4-octylphenyl)thiadiazole 15% by weight 2-(4-hexylcyclohexyl)-5-(4-pentylphenyl)thiadiazole 35% by weight and 5-heptyl-2-(4-pentyloxyphenyl)pyridine 50% by weight was prepared and the following compound (1.5% by weight) was added to the composition, to obtain the following ferroelectric liquid crystal composition:

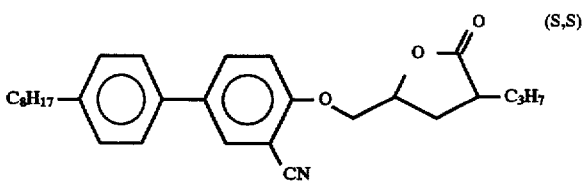

Figure 11:
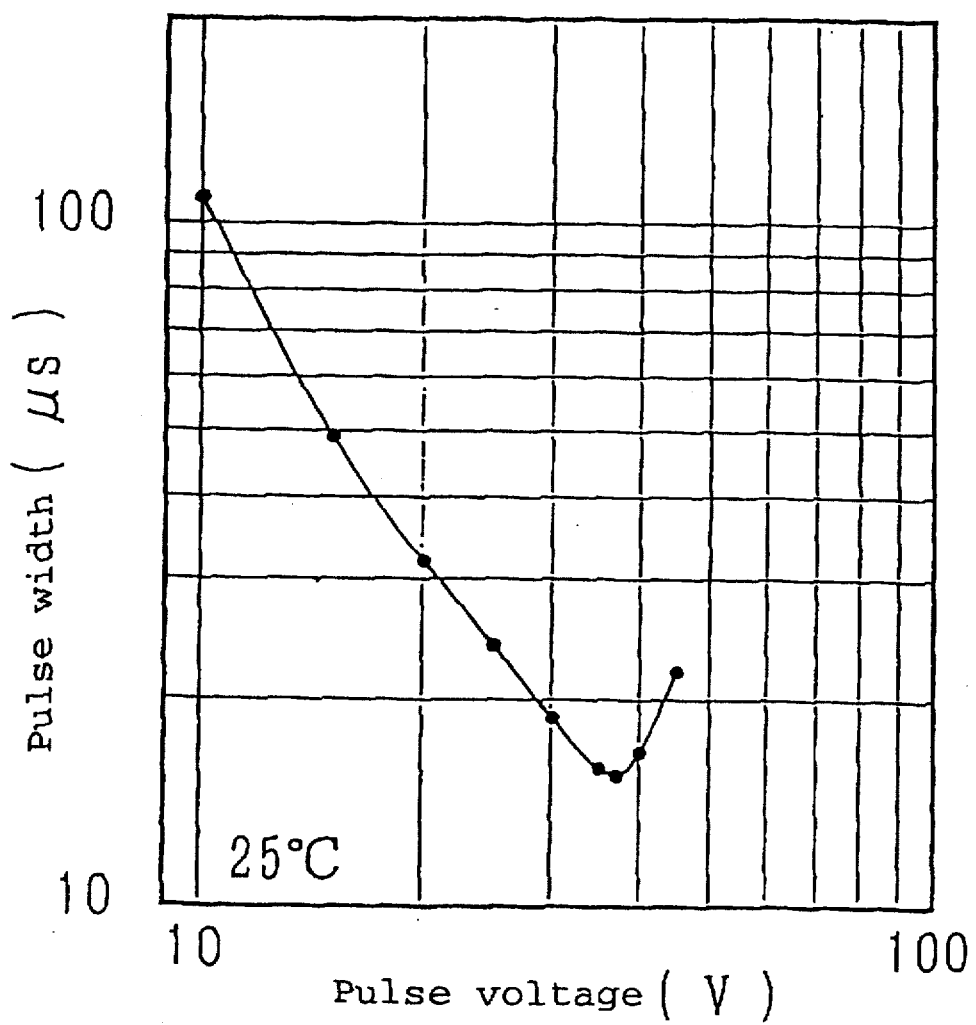
FIG. 11 refers to a view illustrating the τ-V characteristic of the ferroelectric liquid crystal element of Example 24 of the present invention using the ferroelectric liquid crystal composition (n).

Before irradiation Sc* 69.0 SA 89.0 Ne* 101.1 Iso
After irradiation Sc* 68.3 SA 87.2 Ne* 98.5 Iso Irradiation time-dependency of τ-V characteristic of the two compositions of the above Example 22 and Reference example, at the time of irradiation of ultraviolet rays, is shown in FIG. 11.

It can be seen from this figure that the physical properties of the ferroelectric liquid crystal composition composed mainly of the (AI) of the present invention, such as phase transition points, τ-V characteristic, etc., are unchanged by the irradiation of Ultraviolet rays.

EXAMPLE 23

Transparent electrodes consisting of ITO of 100 nm were formed on two sheets of glass substrates, followed by forming an insulating membrane consisting of $SiO_2$ of 100 nm on the transparent electrodes, coating on the insulating membrane, a polyimide aligning membrane in a membrane thickness of 50 nm, formed by condensing 2,2-bis[4-(4-aminophenoxy)phenyl]propane and 1,2,4,5-benzenetetracarboxylic acid dianhydride as main raw materials, and a small quantity of 4-trimethoxysilylaniline added, carrying out rubbing treatment, lamination the two sheets of glass substrates together in a cell gap of 50 μm, so that the rubbing directions could be anti-parallel, and filling a nematic liquid crystal composition E-8 made by Merck Company. The pretilt angle of the above polyimide aligning membrane was measured according to magnetic field capacity method (K. Suzuki, K. Toriyama and A. Fukuhara, Appl. Phys. Lett. 33, 561 (1987), to give 3°.

EXAMPLE 24

Transparent electrodes consisting of ITO of 100 nm were formed on two sheets of glass substrates, followed by forming an insulating membrane consisting of SiO₂ of 100 nm on the transparent electrodes, coating on the insulating membrane, a polyimide aligning membrane in a membrane thickness of 50 nm, formed by condensing 2,2-bis[4-(4-aminophenoxy)phenyl]propane and 1,2,4,5-benzenetetracarboxylic acid dianhydride as main raw materials, and a small quantity of 4-trimethoxysilylaniline added, carrying out rubbing treatment, laminting the two sheets of glass substrates together in a cell gap of 1.4 μm, so that the rubbing directions could be parallel, and filling the ferroelectric liquid crystal compositions (l), (m) and (n) prepared in examples 13, 14 and 15, respectively, to obtain ferroelectric liquid crystal elements having C2 alignment over the total surface inside the pixels.

EXAMPLE 25

Figure 9:
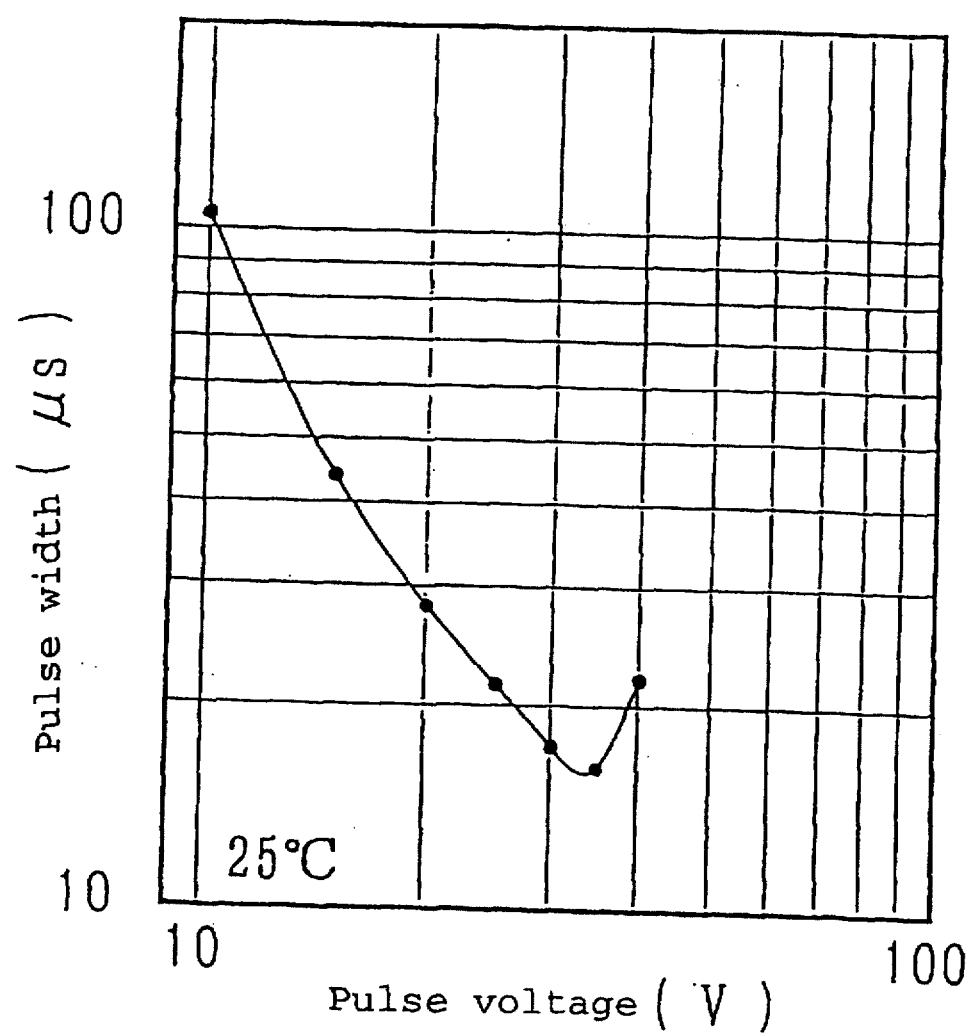
FIG. 9 refers to a view illustrating the τ-V characteristic of the ferroelectric liquid crystal element of Example 24 of the present invention using the ferroelectric liquid crystal composition (l).
Figure 10:
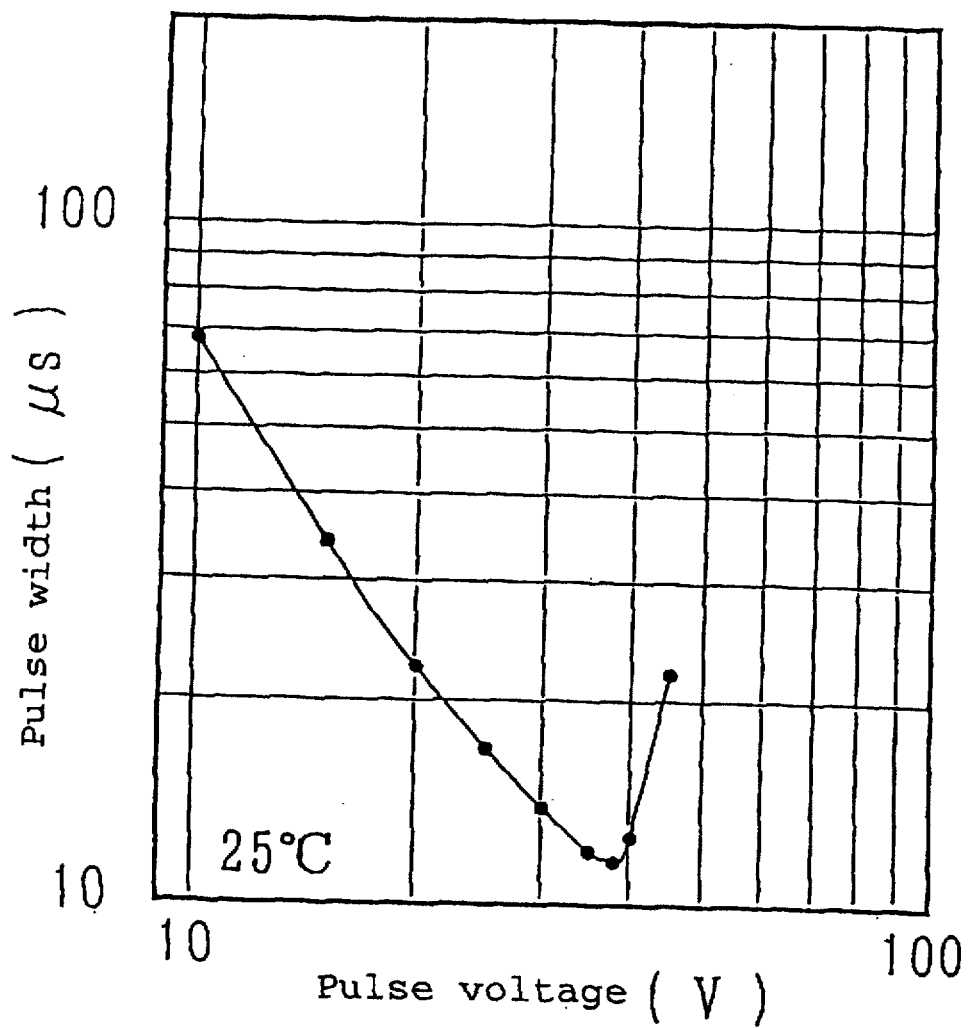
FIG. 10 refers to a view illustrating the τ-V characteristic of the ferroelectric liquid crystal element of Example 24 of the present invention using the ferroelectric liquid crystal composition (m).

Using the ferroelectric liquid crystal element prepared in Example 24, the characteristics of the pulse width (τ)-pulse voltage (V) of monopolar pulse required for switching between two stable states of ferroelectric liquid crystal compositions (l), (m) and (n) were measured at 25° C., to thereby determine the pulse width (τ min) giving the minimum and the pulse voltage (Vmin) at that time. The results are shown in the following table and FIGS. 9–11:

TABLE

|  | Vmin | τmin |
|---|---|---|
| Composition (l) | 35V | 16 μsec |
| Composition (m) | 38V | 12 μsec |
| Composition (n) | 37V | 16 μsec |

EXAMPLE 26

Using the ferroelectric liquid crystal element prepared in Example 24, the ferroelectric liquid crystal compositions (l), (m) and (n) were respectively driven at 25° C., using the driving waveform (B) shown in FIG. 6. The driving conditions and the driving results are shown in the following table:

TABLE

|  | τ | Vs | Vd | Line address time | Driving memory angle |
|---|---|---|---|---|---|
| Composition (l) | 13 μsec | 26V | 8V | 26 μsec | 29.8# |
|  | 14 μsec | 25V | 9V | 28 μsec | 31.8# |
|  | 15 μsec | 24V | 10V | 30 μsec | 34.0# |
| Composition (m) | 8.5 μsec | 29V | 8V | 17 μsec | 28.6# |
|  | 10 μsec | 28V | 9V | 20 μsec | 31.4# |
|  | 11.5 μsec | 27V | 10V | 23 μsec | 33.8# |
| Composition (n) | 12.5 μsec | 27V | 8V | 25 μsec | 34.3° |
|  | 13.5 μsec | 26V | 9V | 27 μsec | 36.8# |
|  | 15.5 μsec | 25V | 10V | 31 μsec | 39.2# |

As described above, the liquid crystal element using the composition of the present invention is possible to effect a high speed driving at a voltage of 40V or lower, in a τ-Vmin mode.

INDUSTRIAL APPLICABILITY

As to the composition of claim 1, SA phase appears over a broad range, and a ferroelectric liquid crystal composition having a good alignment can be provided, and particularly the composition of claim 5 is suitable to stabilized effect and τ-Vmin.

We claim:

1. A Smectic liquid crystal composition comprising component (AI) and component (B) and/or component (C), each expressed by the following formulas:

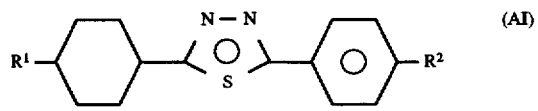

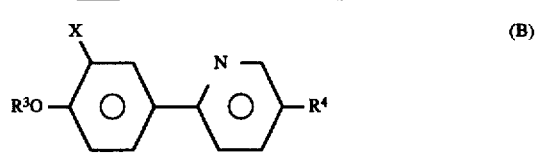

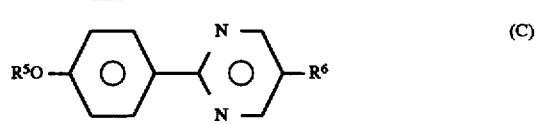

wherein $R^1$ represents an alkyl group of 1 to 9 carbon atoms, $R^2$ represents an alkyl group of 1 to 9 carbon atoms; $R^3$ represents an alkyl group of 1 to 18 carbon atoms, $R^4$ represents an alkyl group of 1 to 18 carbon atoms, X represents H or F, $R^5$ represents an alkyl group of 6 to 15 carbon atoms and $R^6$ represents an alkyl group of 6 to 15 carbon atoms.

2. A smectic liquid crystal composition according to claim 1, comprising component (AI) and component (B).

3. A smectic liquid crystal composition according to claim 1, comprising component (AI) and component (C).

4. A smectic liquid crystal composition according to claim 1, comprising component (AI), component (B) and component (C).

5. A smectic liquid crystal composition according to any one of claims 1 to 3, comprising a component (AII) expressed by the following formula, as an additional component:

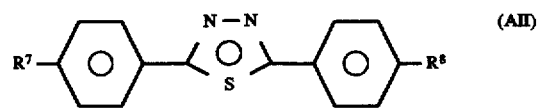

wherein $R^7$ represents an alkyl group of 2 to 9 carbon atoms and $R^8$ represents an alkyl group of 2 to 9 carbon atoms.

6. A smectic liquid crystal composition according to any one of claims 1 to 4, wherein the content ratio (% by weight) of components consisting of components (AI) and (AII) (group A) to components consisting of (B) and (C) (group BC) is 1:3 to 3:1.

7. A smectic liquid crystal composition according to any one of claims 1 to 4, wherein the content ratio by weight of components of group A is 50% by weight or more.

8. A smectic liquid crystal composition containing the composition according to any one of claims 1 to 4, in a quantity of 70% by weight or more based upon the total quantity.

9. A ferroelectric, chiral smectic C liquid crystal composition obtained by adding one or more kinds of optically active compounds to either one of a smectic C liquid crystal composition according to any one of claims 1 to 4.

10. A liquid crystal element using a liquid crystal composition according to claim 9.

11. A liquid crystal element according to claim 10, wherein the bend direction of the smectic layer structure of the ferroelectric liquid crystal is the same as the direction of the monoaxially aligning treatment of the aligning film.

12. A liquid crystal element according to claim 10, characterized in that the pretilt angle of liquid crystal molecules on the intersurface of liquid crystals/aligning film is 10° or less.

13. A process for driving a liquid crystal element provided with a pair of insulating substrates each having an electrode; a chiral smectic liquid crystal composition intervened between the substrates, a driving means for changing over the optical axis of liquid crystals by selectively applying a voltage upon the electrodes; and a means for optically identifying the change-over of the optical axis, wherein a chiral smectic liquid crystal composition according to claim 9 is used as the liquid crystal composition; as the electrodes, a plurality of scanning electrodes and a plurality of signal electrodes are arranged in alternately crossed directions; the chiral smectic liquid crystal composition in the domain where the scanning electrodes are crossed with the signal electrodes constitutes a ferroelectric liquid crystal element having two stable states; and when the domain is rendered as pixels and the pixels are selected, and the pulse voltage to be applied upon the pixels have a relationship of 0<V2<V4 and V2−V1<V4−V3, wherein V1 and V2 refer to a first pulse voltage and a second pulse voltage, respectively in one stable state of the ferroelectric liquid crystal molecules, and V3 and V4 refer to the same in another stable state of the ferroelectric liquid crystal molecules constituting a portion of the pixels, even when the second pulse voltage V2 is applied successively to the first pulse voltage V1 or the second pulse voltage −V2 is applied successively to the first pulse voltage −V1, to thereby make the ferroelectric liquid crystal molecules constituting the portion within the pixels, one stable state, or another stable state, and even when the second pulse V4 is applied upon the same pixels, successively to the first pulse V3, or the second pulse voltage −V4 is applied successively to the first pulse voltage −V3 the above stable states of the ferroelectric liquid crystal molecules constituting the same portion inside the pixels are retained.

14. A process for driving a liquid crystal element according to claim 13, characterized in that the chiral smectic liquid crystal composition is a ferroelectric liquid crystal element having two stable states, and in the pulse width-pulse voltage characteristic of the single polarity pulse necessary for rewriting from one stable state to the other stable state, the pulse voltage affording the minimum value of the pulse width is 60 V or lower.

15. A process for driving a liquid crystal element according to claim 13, characterized in that the chiral smectic liquid crystal composition constitutes a ferroelectric liquid crystal element having two stable states, and in the pulse width-pulse voltage characteristic of the single-polarity pulse necessary for rewriting from one stable state to the other stable state, the pulse voltage affording the minimum value of the pulse width is 40V or lower.

* * * * *